US 12,406,586 B2

(12) United States Patent
Lund

(10) Patent No.: US 12,406,586 B2
(45) Date of Patent: Sep. 2, 2025

(54) 3D LOCALIZATION AND MAPPING SYSTEMS AND METHODS

(71) Applicants: FLIR UNMANNED AERIAL SYSTEMS AS, Hvalstad (NO); FLIR SYSTEMS INC., Wilsonville, OR (US)

(72) Inventor: Jon Elvira Andres Lund, Asker (NO)

(73) Assignee: FLIR Unmanned Aerial Systems AS, Hvalstad (NO)

( * ) Notice: Subject to any disclaimer, the term of this patent is extended or adjusted under 35 U.S.C. 154(b) by 259 days.

(21) Appl. No.: 17/615,779

(22) PCT Filed: May 26, 2020

(86) PCT No.: PCT/US2020/034585
§ 371 (c)(1),
(2) Date: Dec. 1, 2021

(87) PCT Pub. No.: WO2020/247212
PCT Pub. Date: Dec. 10, 2020

(65) Prior Publication Data
US 2022/0230550 A1 Jul. 21, 2022

Related U.S. Application Data

(60) Provisional application No. 62/857,225, filed on Jun. 4, 2019.

(51) Int. Cl.
*G08G 5/55* (2025.01)
*B64U 10/14* (2023.01)
(Continued)

(52) U.S. Cl.
CPC ............... *G08G 5/55* (2025.01); *B64U 20/87* (2023.01); *G05D 1/106* (2019.05); *G08G 5/21* (2025.01);
(Continued)

(58) Field of Classification Search
CPC .... G08G 5/0069; G08G 5/0021; G05D 1/106; B64C 39/024; B64U 2201/10; B64U 2101/30
See application file for complete search history.

(56) References Cited

U.S. PATENT DOCUMENTS

| 8,260,539 B2 | 9/2012 | Zeng |
| 10,317,519 B2 * | 6/2019 | Rohani ................... G01S 13/89 |

(Continued)

FOREIGN PATENT DOCUMENTS

| CN | 102023003 A | 4/2011 |
| CN | 103808316 A | 5/2014 |

(Continued)

OTHER PUBLICATIONS

Clark, Matthew et al., "Autonomous quadrotor terrain-following with a laser rangefinder and gimbal system," 2017 IEEE Sensors, 2017, pp. 1-3. (Abstract only).

*Primary Examiner* — Aniss Chad
*Assistant Examiner* — Christopher George Fees
(74) *Attorney, Agent, or Firm* — Haynes and Boone, LLP

(57) ABSTRACT

Localization and mapping systems and related techniques are provided to improve the operation of unmanned mobile sensor or survey platforms. A localization and mapping system includes a logic device configured to communicate with a single element rangefinder (SER) coupled to a mobile platform, where the SER is configured to provide ranging sensor data indicating a distance between the SER and a surface within a survey area. The logic device generates a horizontal planar occupancy map, generates a vertical planar occupancy map, and determines a three-dimensional occupancy map based on the horizontal planar occupancy map and the vertical planar occupancy map.

20 Claims, 12 Drawing Sheets

(51) Int. Cl.
*B64U 10/25* (2023.01)
*B64U 20/87* (2023.01)
*B64U 101/31* (2023.01)
*G05D 1/00* (2024.01)
*G08G 5/21* (2025.01)
*G08G 5/57* (2025.01)

(52) U.S. Cl.
CPC ............... *G08G 5/57* (2025.01); *B64U 10/14* (2023.01); *B64U 10/25* (2023.01); *B64U 2101/31* (2023.01); *B64U 2201/10* (2023.01); *B64U 2201/20* (2023.01)

(56) References Cited

U.S. PATENT DOCUMENTS

| | | | |
|---|---|---|---|
| 11,629,962 B2 * | 4/2023 | Kudrynski | G01S 13/89 701/450 |
| 11,675,092 B2 * | 6/2023 | Adachi | G01S 19/44 342/357.27 |
| 11,755,041 B2 * | 9/2023 | Zhu | B64C 39/024 701/3 |
| 11,774,983 B1 * | 10/2023 | Zhang | G05D 1/0246 701/28 |
| 2019/0050000 A1 * | 2/2019 | Kennedy | G05D 1/102 |
| 2019/0094363 A1 * | 3/2019 | Ohtomo | G01C 5/005 |
| 2019/0187711 A1 * | 6/2019 | Xie | G01S 7/4817 |
| 2019/0250601 A1 * | 8/2019 | Donahoe | G05D 1/101 |
| 2020/0142410 A1 * | 5/2020 | Liu | G01C 21/3848 |
| 2023/0228880 A1 * | 7/2023 | Lin | G01S 17/931 356/4.01 |
| 2023/0257116 A1 * | 8/2023 | Kennedy | B64C 39/024 701/3 |

FOREIGN PATENT DOCUMENTS

| | | |
|---|---|---|
| CN | 105759829 A | 7/2016 |
| CN | 109661349 A | 4/2019 |
| KR | 10-2019-0035496 | 4/2019 |
| WO | WO 2018/039975 A1 | 3/2018 |

* cited by examiner

3D LOCALIZATION AND MAPPING SYSTEMS AND METHODS

CROSS-REFERENCE TO RELATED APPLICATIONS

This patent application is a U.S. National Stage Patent Application under 35 U.S.C. 371 of International Patent Application No. PCT/US2020/034585 filed May 26, 2020 and entitled "3D LOCALIZATION AND MAPPING SYSTEM AND METHOD," which claims priority to and the benefit of U.S. Provisional Patent Application No. 62/857,225 filed Jun. 4, 2019 and entitled "3D LOCALIZATION AND MAPPING SYSTEMS AND METHODS," which are hereby incorporated by reference in their entirety.

TECHNICAL FIELD

One or more embodiments relate generally to mapping and more particularly, for example, to localization and mapping systems and methods with rangefinders for unmanned aerial vehicles.

BACKGROUND

Modern unmanned sensor platforms, such as unmanned aerial vehicles (UAVs), remotely operated underwater vehicles (ROVs), unmanned (water) surface vehicles (USVs), and unmanned ground vehicles (UGVs) are able to operate over long distances and in all environments; rural, urban, and even underwater. Such systems typically must be small enough to satisfy mission requirements, and mission requirements typically include size, weight, and power constraints. General operational demands have increased as the demand for performance of unmanned platforms has increased. Thus, there is a need in the art for methodologies to reliably provide localization and mapping for unmanned platforms as the general operational demands increase.

SUMMARY

Localization and mapping systems and related techniques are provided to improve the operation of unmanned mobile sensor or survey platforms. One or more embodiments of the described localization and mapping systems may advantageously include a single element rangefinder (SER). The SER may include a single ranging sensor element and that may be used to provide ranging sensor data indicating a distance between the SER and a surface intercepting a sensor axis of the SER corresponding to the single ranging sensor element. One or more embodiments of the described localization and mapping system may include a gimbal system to couple the SER to a mobile platform and adjust a relative orientation of the SER relative to the mobile platform. One or more embodiments of the described localization and mapping system may include a logic device to determine a three-dimensional spatial occupancy map based on a horizontal planar occupancy map and a vertical occupancy map.

In one embodiment, a system includes a mobile platform, a SER, a gimbal system, and a logic device configured to communicate with the SER, the gimbal system, and/or the mobile platform. The SER may include a single ranging sensor element, where the SER is configured to provide ranging sensor data indicating a distance between the SER and a surface intercepting a sensor axis of the SER corresponding to the single ranging sensor element. The gimbal system may be configured to couple the SER to the mobile platform and adjust an orientation of and aim the SER relative to the mobile platform. The logic device may be configured to generate a horizontal planar occupancy map based, at least in part, on an altitude and a projected course of the mobile platform; to generate a vertical planar occupancy map based, at least in part, on the projected course of the mobile platform; and to determine a three-dimensional occupancy map based on the horizontal planar occupancy map and the vertical planar occupancy map.

In another embodiment, a method includes generating a horizontal planar occupancy map based, at least in part, on a first set of ranging sensor data provided by a SER coupled to a mobile platform via a gimbal system, an altitude of the mobile platform, and a projected course of the mobile platform, where the SER comprises a single ranging sensor element configured to provide ranging sensor data indicating a distance between the SER and a surface intercepting a sensor axis of the SER corresponding to the single ranging sensor element, and where the gimbal system is configured to adjust an orientation of and aim the SER relative to the mobile platform; generating a vertical planar occupancy map based, at least in part, on a second set of ranging sensor data provided by the SER and the projected course of the mobile platform; and determining a three-dimensional occupancy map based, at least in part, on the horizontal planar occupancy map and the vertical planar occupancy map.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1:
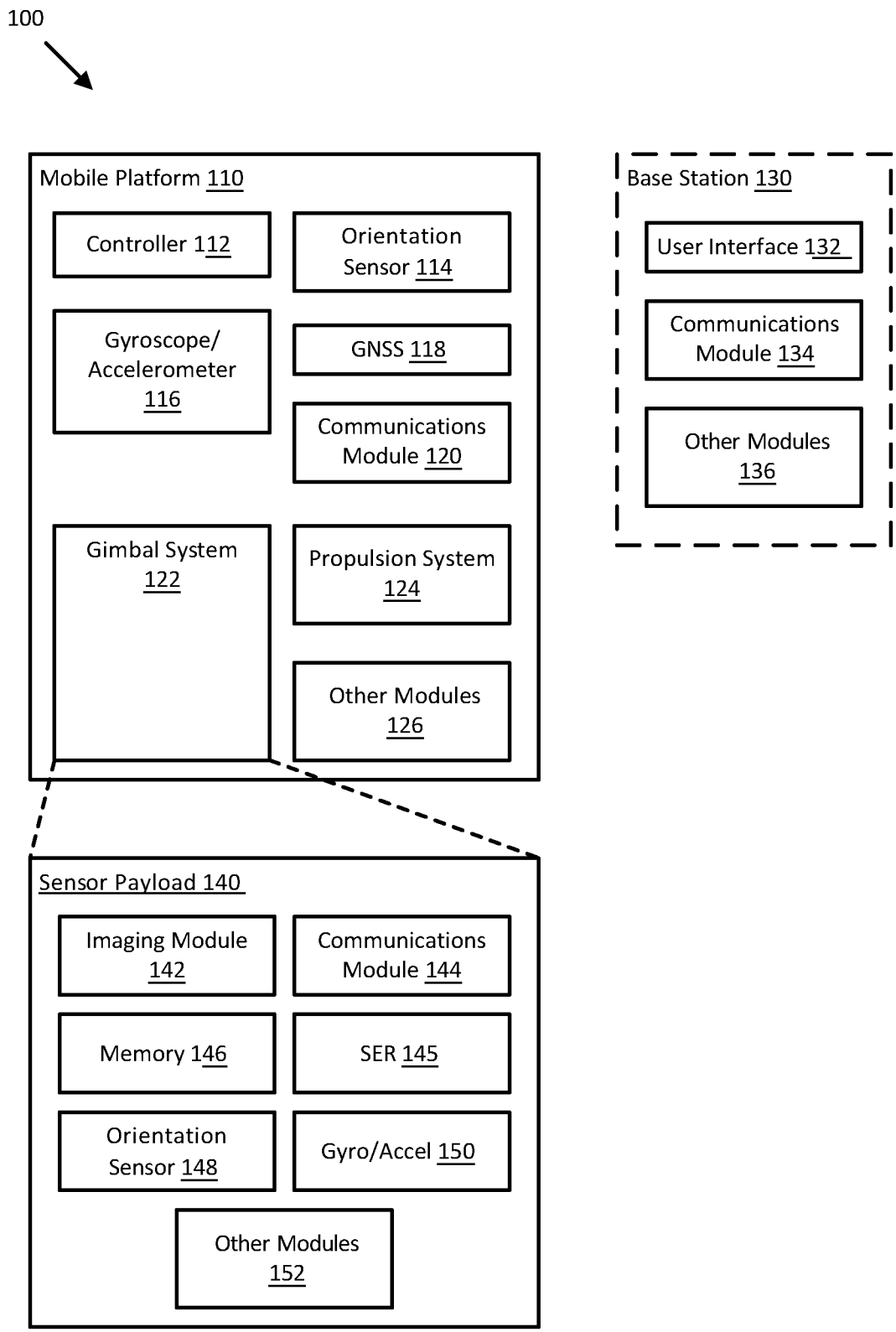
FIG. 1 illustrates a diagram of a survey system in accordance with an embodiment of the disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

Modern unmanned sensor platforms, such as unmanned aerial vehicles (UAVs), remotely operated underwater vehicles (ROVs), unmanned (water) surface vehicles (USVs), and unmanned ground vehicles (UGVs) are able to operate over long distances and in a variety of environments. Such systems typically rely on a navigation system to operate in unknown or unmapped environments. In traversing such environments, collecting spatial information about the environments can be helpful to augment a conventional navigation system and/or provide sufficient situational awareness to maneuver through such environments when a conventional navigation system is unable to provide reliable estimates of a position and/or orientation of a mobile platform.

Small UAVs (e.g., below 250 g) have size, weight, and power constraints for the various sensors and components of the UAVs. In order to satisfy the various constraints for a particular mission, functional or operational trade-offs, replacements, and/or substitutions may be required. For example, the size and/or weight of sensors that can be carried onboard a UAV to facilitate localization and mapping may be restricted due to the constraints of a mission objective. Cameras may be used as a source for localization information when navigating in GPS-denied environments, but cameras can be difficult to operate in darkness, smoke, fog, and/or survey areas with few distinct visual features. Additionally, cameras sometimes have problems detecting reflective surfaces, such as glass and mirrors. Time-of-flight sensors such as radar, sonar, and LIDAR may compensate for the weaknesses of vision-based systems such as cameras, but such systems are often too heavy to include in a relatively small UAV.

Three-dimensional localization and mapping systems and related techniques are provided to improve the operational flexibility and reliability of unmanned sensor platforms. For example, the present disclosure includes systems and techniques that provide for robust position and orientation estimates for UAV operation in situations where conventional navigation systems (e.g., GPS and/or magnetic compass) and/or vision-based systems for the UAV lack sufficient spatial resolution or have otherwise failed. For example, vision-based systems for navigation may fail when the UAV is operating in complete darkness in a cave or building and/or while flying through thick smoke in a burning building. Embodiments disclosed herein address these deficiencies by providing a three-dimensional localization and mapping system including a relatively light-weight single element rangefinder (SER) and configured to scan in a specific pattern that allows an unmanned sensor platform to calculate a limited but sufficient three-dimensional map of the environment and the unmanned platform's position within the three-dimensional map.

In some embodiments, a three-dimensional localization and mapping system includes a mobile platform and a SER including a single ranging sensor element. The SER may be configured to provide ranging sensor data indicating a distance between the SER and a surface intercepting a sensor axis of the SER corresponding to the single ranging sensor element. The system may include a gimbal system configured to couple the SER to the mobile platform and adjust a relative orientation of the SER relative to the mobile platform. The system may include a logic device configured to communicate with the SER, the gimbal system, and/or the mobile platform. The logic device may be configured to generate a horizontal planar occupancy map based, at least in part, on an altitude and a projected course of the mobile platform, to generate a vertical planar occupancy map based, at least in part, on the projected course of the mobile platform, and to determine a three-dimensional occupancy map based on the horizontal planar occupancy map and the vertical planar occupancy map. In various embodiments, a three-dimensional localization and mapping method includes generating a horizontal planar occupancy map based, at least in part, on an altitude and a projected course of a mobile platform, generating a vertical planar occupancy map based, at least in part, on the projected course of the mobile platform, and determining a three-dimensional occupancy map based on the horizontal planar occupancy map and the vertical planar occupancy map.

FIG. 1 illustrates a block diagram of a survey system 100 including a mobile platform 110 with a SER 145, in accordance with an embodiment of the disclosure. In various embodiments, system 100 and/or elements of system 100 may be configured to fly over a scene or survey area, to fly through a structure, or to approach a target and image or sense the scene, structure, or target, or portions thereof, using gimbal system 122 to aim imaging system/sensor payload 140 at the scene, structure, or target, or portions thereof, for example. Resulting imagery and/or other sensor data may be processed (e.g., by sensor payload 140, mobile platform 110, and/or base station 130) and displayed to a user through use of user interface 132 (e.g., one or more displays such as a multi-function display (MFD), a portable electronic device such as a tablet, laptop, or smart phone, or other appropriate interface) and/or stored in memory for later viewing and/or analysis. In some embodiments, system 100 may be configured to use such imagery and/or sensor data to control operation of mobile platform 110 and/or sensor payload 140, as described herein, such as controlling gimbal system 122 to aim sensor payload 140 towards a particular direction, or controlling propulsion system 124 to move mobile platform 110 to a desired position in a scene or structure or relative to a target.

In the embodiment shown in FIG. 1, survey system 100 includes mobile platform 110, optional base station 130, and at least one imaging system/sensor payload 140. Mobile platform 110 may be implemented as a mobile platform configured to move or fly and position and/or aim sensor payload 140 (e.g., relative to a designated or detected target). As shown in FIG. 1, mobile platform 110 may include one or more of a controller 112, an orientation sensor 114, a gyroscope/accelerometer 116, a global navigation satellite system (GNSS) 118, a communications module 120, a gimbal system 122, a propulsion system 124, and other modules 126. Operation of mobile platform 110 may be substantially autonomous and/or partially or completely controlled by optional base station 130, which may include one or more of a user interface 132, a communications module 134, and other modules 136. In other embodiments, mobile platform 110 may include one or more of the elements of base station 130, such as with various types of manned aircraft, terrestrial vehicles, and/or surface or subsurface watercraft. Sensor payload 140 may be physically coupled to mobile platform 110 and be configured to capture sensor data (e.g., visible spectrum images, infrared images, narrow aperture radar data, and/or other sensor data) of a target position, area, and/or object(s) as selected and/or framed by operation of mobile platform 110 and/or base station 130. In some embodiments, one or more of the elements of system 100 may be implemented in a combined housing or structure that can be coupled to or within mobile platform 110 and/or held or carried by a user of system 100.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of mobile platform 110 and/or other elements of system 100, such as the gimbal system 122, for example. Such software instructions may also implement methods for processing infrared images and/or other sensor signals, determining sensor information, providing user feedback (e.g., through user interface 132), querying devices for operational parameters, selecting operational parameters for devices, or performing any of the various operations described herein (e.g., operations performed by logic devices of various elements of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user using user interface 132. In some embodiments, controller 112 may be integrated with one or more other elements of mobile platform 110, for example, or distributed as multiple logic devices within mobile platform 110, base station 130, and/or sensor payload 140.

In some embodiments, controller 112 may be configured to substantially continuously monitor and/or store the status of and/or sensor data provided by one or more elements of mobile platform 110, sensor payload 140, and/or base station 130, such as the position and/or orientation of mobile platform 110, sensor payload 140, and/or base station 130, for example. Such sensor data may include ranging sensor data provided SER 145. In various embodiments, ranging sensor data provided by SER 145 indicates a distance between SER 145 and a surface intercepting a sensor axis of SER 145 corresponding to a single ranging sensor element of SER 145. In some embodiments, such ranging sensor data may be used to generate a three-dimensional occupancy map for the environment or survey area in which mobile platform 110 is operating, localize mobile platform 110 within the occupancy map, and/or determine a projected course or avoidance course for mobile platform 110 according to the occupancy map. For example, a first set of ranging sensor data may be provided by SER 145, and the first set of ranging sensor data may be used to generate a horizontal planar occupancy map. A second set of ranging sensor data may be provided by SER 145, and the second set of ranging sensor data may be used to generate a vertical planar occupancy map. In some embodiments, the first set of ranging sensor data may correspond to a horizontal planar scan relative to mobile platform 110, and the second set of ranging sensor data may correspond to a vertical planar scan relative to mobile platform 110. In various embodiments, sensor data may be monitored and/or stored by controller 112 and/or processed or transmitted between elements of system 100 substantially continuously throughout operation of system 100, where such data includes various types of sensor data, control parameters, and/or other data, as described herein.

Orientation sensor 114 may be implemented as one or more of a compass, float, accelerometer, and/or other device capable of measuring an orientation of mobile platform 110 (e.g., magnitude and direction of roll, pitch, and/or yaw, relative to one or more reference orientations such as gravity and/or Magnetic North), gimbal system 122, imaging system/sensor payload 140, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile platform 110 and/or other elements of system 100 and providing such measurements as sensor signals and/or data that may be communicated to other devices of system 100 (e.g., user interface 132, controller 112). GNSS 118 may be implemented according to any global navigation satellite system, including a GPS, GLONASS, and/or Galileo based receiver and/or other device capable of determining absolute and/or relative position of mobile platform 110 (e.g., or an element of mobile platform 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS 118 may include an altimeter, for example, or may be used to provide an absolute altitude.

Communications module 120 may be implemented as any wired and/or wireless communications module configured to transmit and receive analog and/or digital signals between elements of system 100. For example, communications module 120 may be configured to receive flight control signals and/or data from base station 130 and provide them to controller 112 and/or propulsion system 124. In other embodiments, communications module 120 may be configured to receive images and/or other sensor information (e.g., visible spectrum and/or infrared still images or video images) from sensor payload 140 and relay the sensor data to controller 112 and/or base station 130. In some embodiments, communications module 120 may be configured to support spread spectrum transmissions, for example, and/or multiple simultaneous communications channels between elements of system 100. Wireless communication links may include one or more analog and/or digital radio communication links, such as Wi-Fi and others, as described herein, and may be direct communication links established between elements of system 100, for example, or may be relayed through one or more wireless relay stations configured to receive and retransmit wireless communications. Communication links established by communication module 120 may be configured to transmit data between elements of system 100 substantially continuously throughout operation of system 100, where such data includes various types of sensor data, control parameters, and/or other data, as described herein.

Gimbal system 122 may be implemented as an actuated gimbal mount, for example, that may be controlled by controller 112 to stabilize sensor payload 140 relative to a target or to aim sensor payload 140 (e.g., or components coupled thereto, such as SER 145) according to a desired direction and/or relative orientation or position. As such, gimbal system 122 may be configured to provide a relative orientation of sensor payload 140 (e.g., relative to an orientation of mobile platform 110) to controller 112 and/or communications module 120 (e.g., gimbal system 122 may include its own orientation sensor 114). In other embodiments, gimbal system 122 may be implemented as a gravity driven mount (e.g., non-actuated). In various embodiments, gimbal system 122 may be configured to provide power, support wired communications, and/or otherwise facilitate operation of articulated sensor/sensor payload 140. In further embodiments, gimbal system 122 may be configured to couple to a laser pointer, range finder, and/or other device, for example, to support, stabilize, power, and/or aim multiple devices (e.g., sensor payload 140 and one or more other devices) substantially simultaneously.

In some embodiments, gimbal system 122 may be adapted to rotate sensor payload 140+−90 degrees, or up to 360 degrees, in a vertical plane relative to an orientation and/or position of mobile platform 110. In some embodiments, gimbal system 122 may be configured to limit rotation of SER 145 such that SER 145 provides angle-limited ranging sensor data corresponding to an arcuate portion of a horizontal or vertical plane centered on a projected course for mobile platform 110 and comprising an angular width between, for example, 5 degrees angular width and 180 degrees angular width. In other embodiments, such angular width may be greater than 180 degrees or less than 5 degrees, depending on the desired application. In further embodiments, gimbal system 122 may rotate sensor payload 140 to be parallel to a longitudinal axis or a lateral axis of mobile platform 110 as mobile platform 110 yaws, which may provide 360 degree ranging and/or imaging in a horizontal plane relative to mobile platform 110. In various embodiments, controller 112 may be configured to monitor an orientation of gimbal system 122 and/or sensor payload 140 relative to mobile platform 110, for example, or an absolute or relative orientation of an element of sensor payload 140 (e.g., SER 145). Such orientation data may be transmitted to other elements of system 100 for monitoring, storage, or further processing, as described herein.

Propulsion system 124 may be implemented as one or more propellers, turbines, or other thrust-based propulsion systems, and/or other types of propulsion systems that can be used to provide motive force and/or lift to mobile platform 110 and/or to steer mobile platform 110. In some embodiments, propulsion system 124 may include multiple propellers (e.g., a tri, quad, hex, oct, or other type "copter") that can be controlled (e.g., by controller 112) to provide lift and motion for mobile platform 110 and to provide an orientation for mobile platform 110. In other embodiments, propulsion system 124 may be configured primarily to provide thrust while other structures of mobile platform 110 provide lift, such as in a fixed wing embodiment (e.g., where wings provide the lift) and/or an aerostat embodiment (e.g., balloons, airships, hybrid aerostats). In various embodiments, propulsion system 124 may be implemented with a portable power supply, such as a battery and/or a combustion engine/generator and fuel supply.

Other modules 126 may include other and/or additional sensors, actuators, communications modules/nodes, and/or user interface devices, for example, and may be used to provide additional environmental information related to operation of mobile platform 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), an irradiance detector, and/or other environmental sensors providing measurements and/or other sensor signals that can be displayed to a user and/or used by other devices of system 100 (e.g., controller 112) to provide operational control of mobile platform 110 and/or system 100.

In some embodiments, other modules 126 may include one or more actuated and/or articulated devices (e.g., multi-spectrum active illuminators, visible and/or IR cameras, radars, sonars, and/or other actuated devices) coupled to mobile platform 110, where each actuated device includes one or more actuators adapted to adjust an orientation of the device, relative to mobile platform 110, in response to one or more control signals (e.g., provided by controller 112). In particular, other modules 126 may include a stereo vision system configured to provide image data that may be used to calculate or estimate a position of mobile platform 110, for example, or to calculate or estimate a relative position of a navigational hazard in proximity to mobile platform 110. In various embodiments, controller 112 may be configured to use such proximity and/or position information to help safely pilot mobile platform 110 and/or monitor communication link quality, as described herein.

User interface 132 of base station 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by communications module 134 of base station 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of mobile platform 110 and/or other elements of system 100. For example, user interface 132 may be adapted to display a time series of positions, headings, and/or orientations of mobile platform 110 and/or other elements of system 100 overlaid on a geographical map, which may include one or more graphs indicating a corresponding time series of actuator control signals, sensor information, and/or other sensor and/or control signals.

In some embodiments, user interface 132 may be adapted to accept user input including a user-defined target heading, waypoint, route, and/or orientation for an element of system 100, for example, and to generate control signals to cause mobile platform 110 to move according to the target heading, route, and/or orientation, or to aim sensor payload 140 accordingly. In other embodiments, user interface 132 may be adapted to accept user input modifying a control loop parameter of controller 112, for example. In further embodiments, user interface 132 may be adapted to accept user input including a user-defined target attitude, orientation, and/or position for an actuated or articulated device (e.g., sensor payload 140) associated with mobile platform 110, for example, and to generate control signals for adjusting an orientation and/or position of the actuated device according to the target altitude, orientation, and/or position. Such control signals may be transmitted to controller 112 (e.g., using communications modules 134 and 120), which may then control mobile platform 110 accordingly.

Communications module 134 may be implemented as any wired and/or wireless communications module configured to transmit and receive analog and/or digital signals between elements of system 100. For example, communications module 134 may be configured to transmit flight control signals from user interface 132 to communications module 120 or 144. In other embodiments, communications module 134 may be configured to receive sensor data (e.g., visible spectrum and/or infrared still images or video images, or other sensor data) from sensor payload 140. In some embodiments, communications module 134 may be configured to support spread spectrum transmissions, for example, and/or multiple simultaneous communications channels between elements of system 100. In various embodiments, communications module 134 may be configured to monitor the status of a communication link established between base station 130, sensor payload 140, and/or mobile platform 110 (e.g., including packet loss of transmitted and received data between elements of system 100, such as with digital communication links), as described herein. Such status information may be provided to user interface 132, for example, or transmitted to other elements of system 100 for monitoring, storage, or further processing, as described herein.

Other modules 136 of base station 130 may include other and/or additional sensors, actuators, communications modules/nodes, and/or user interface devices used to provide additional environmental information associated with base station 130, for example. In some embodiments, other modules 136 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by other devices of system 100 (e.g., controller 112) to provide operational control of mobile platform 110 and/or system 100 or to process sensor data to compensate for environmental conditions, such as an water content in the atmosphere approximately at the same altitude and/or within the same area as mobile platform 110 and/or base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by user interface 132).

In embodiments where imaging system/sensor payload 140 is implemented as an imaging device, imaging system/sensor payload 140 may include imaging module 142, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, imaging module 142 may include one or more logic devices (e.g., similar to controller 112) that can be configured to process imagery captured by detector elements of imaging module 142 before providing the imagery to memory 146 or communications module 144. More generally, imaging module 142 may be configured to perform any of the operations or methods described herein, at least in part, or in combination with controller 112 and/or user interface 132.

In some embodiments, sensor payload 140 may be implemented with a second or additional imaging modules similar to imaging module 142, for example, that may include detector elements configured to detect other electromagnetic spectrums, such as visible light, ultraviolet, and/or other electromagnetic spectrums or subsets of such spectrums. In various embodiments, such additional imaging modules may be calibrated or registered to imaging module 142 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

In one embodiment, sensor payload 140 may include SER 145. SER 145 may be implemented with a single ranging sensor element and may be configured to provide ranging sensor data indicating a distance between SER 145 and a surface intercepting a sensor axis of SER 145 corresponding to its single ranging sensor element. In various embodiments, SER 145 may be configured or adapted to provide relatively precise, substantially real-time range measurements and present relatively low power consumption to mobile platform 110 (e.g., less than 1 mW, continuous). For example, SER 145 may be configured to determine a distance between SER 145 and targets that are moving or stationary relative to mobile platform 110. In some embodiments, SER 145 may include one or more logic devices (e.g., similar to controller 112) that may be configured to process ranging sensor data generated by the sensor element of SER 145 before providing ranging sensor data to memory 146 or communications module 144. More generally, SER 145 may be configured to perform any of the operations or methods described herein, at least in part, or in combination with controller 112, communications module 120, gimbal system 122, and/or other elements of sensor payload 140 and/or mobile platform 110.

Communications module 144 of sensor payload 140 may be implemented as any wired and/or wireless communications module configured to transmit and receive analog and/or digital signals between elements of system 100. For example, communications module 144 may be configured to transmit infrared images from imaging module 142 to communications module 120 or 134. As another example, communications module 144 may be configured to transmit measurement ranges from SER 145 to communications module 120 or 134. In other embodiments, communications module 144 may be configured to receive control signals (e.g., control signals directing capture, focus, selective filtering, and/or other operation of sensor payload 140) from controller 112 and/or user interface 132. In some embodiments, communications module 144 may be configured to support spread spectrum transmissions, for example, and/or multiple simultaneous communications channels between elements of system 100. In various embodiments, communications module 144 may be configured to monitor and communicate the status of an orientation of the sensor payload 140 as described herein. Such status information may be provided to SER 145, for example, or transmitted to other elements of system 100 for monitoring, storage, or further processing, as described herein.

Memory 146 may be implemented as one or more machine readable mediums and/or logic devices configured to store software instructions, sensor signals, control signals, operational parameters, calibration parameters, infrared images, and/or other data facilitating operation of system 100, for example, and provide it to various elements of system 100. Memory 146 may also be implemented, at least in part, as removable memory, such as a secure digital memory card for example including an interface for such memory.

Orientation sensor 148 of sensor payload 140 may be implemented similar to orientation sensor 114 or gyroscope/accelerometer 116, and/or any other device capable of measuring an orientation of sensor payload 140, imaging module 142, and/or other elements of sensor payload 140 (e.g., magnitude and direction of roll, pitch, and/or yaw, relative to one or more reference orientations such as gravity, Magnetic North, and/or an orientation of mobile platform 110) and providing such measurements as sensor signals that may be communicated to various devices of system 100. Gyroscope/accelerometer (e.g., angular motion sensor) 150 of sensor payload 140 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of sensor payload 140 and/or various elements of sensor payload 140 and providing such measurements as sensor signals that may be communicated to various devices of system 100.

Other modules 152 of sensor payload 140 may include other and/or additional sensors, actuators, communications modules/nodes, cooled or uncooled optical filters, and/or user interface devices used to provide additional environmental information associated with sensor payload 140, for example. In some embodiments, other modules 152 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by imaging module 142 or other devices of system 100 (e.g., controller 112) to provide operational control of mobile platform 110 and/or system 100 or to process imagery to compensate for environmental conditions.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100. In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet®, Wi-Fi®, Bluetooth®, Zigbee®, Xbee®, Micronet, or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements. Each element of system 100 may include one or more batteries, capacitors, or other electrical power storage devices, for example, and may include one or more solar cell modules or other electrical power generating devices. In some embodiments, one or more of the devices may be powered by a power source for mobile platform 110, using one or more power leads. Such power leads may also be used to support one or more communication techniques between elements of system 100.

Figure 2:
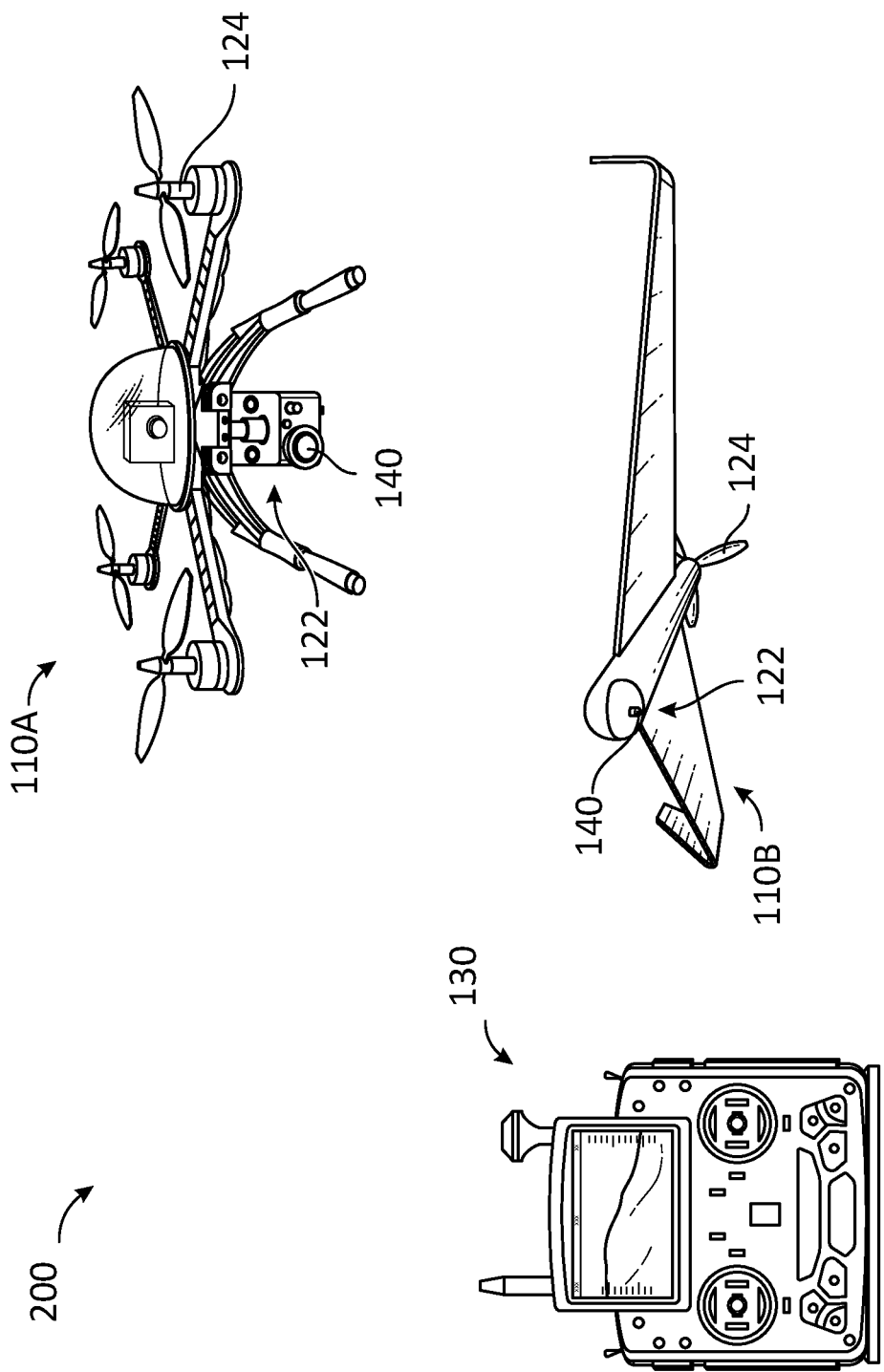
FIG. 2 illustrates a diagram of a survey system including mobile platforms in accordance with an embodiment of the disclosure.

FIG. 2 illustrates a diagram of survey system 200 including mobile platforms 110A and 110B, each with SERs 145/sensor payloads 140 and associated gimbal systems 122 in accordance with an embodiment of the disclosure. In the embodiment shown in FIG. 2, survey system 200 includes base station 130, mobile platform 110A with articulated imaging system/sensor payload 140 and gimbal system 122, and mobile platform 110B with articulated imaging system/sensor payload 140 and gimbal system 122, where base station 130 may be configured to control motion, position, and/or orientation of mobile platform 110A, mobile platform 110B, and/or sensor payloads 140. More generally, survey system 200 may include any number of mobile platforms 110, 110A, and/or 110B.

Figure 3A:
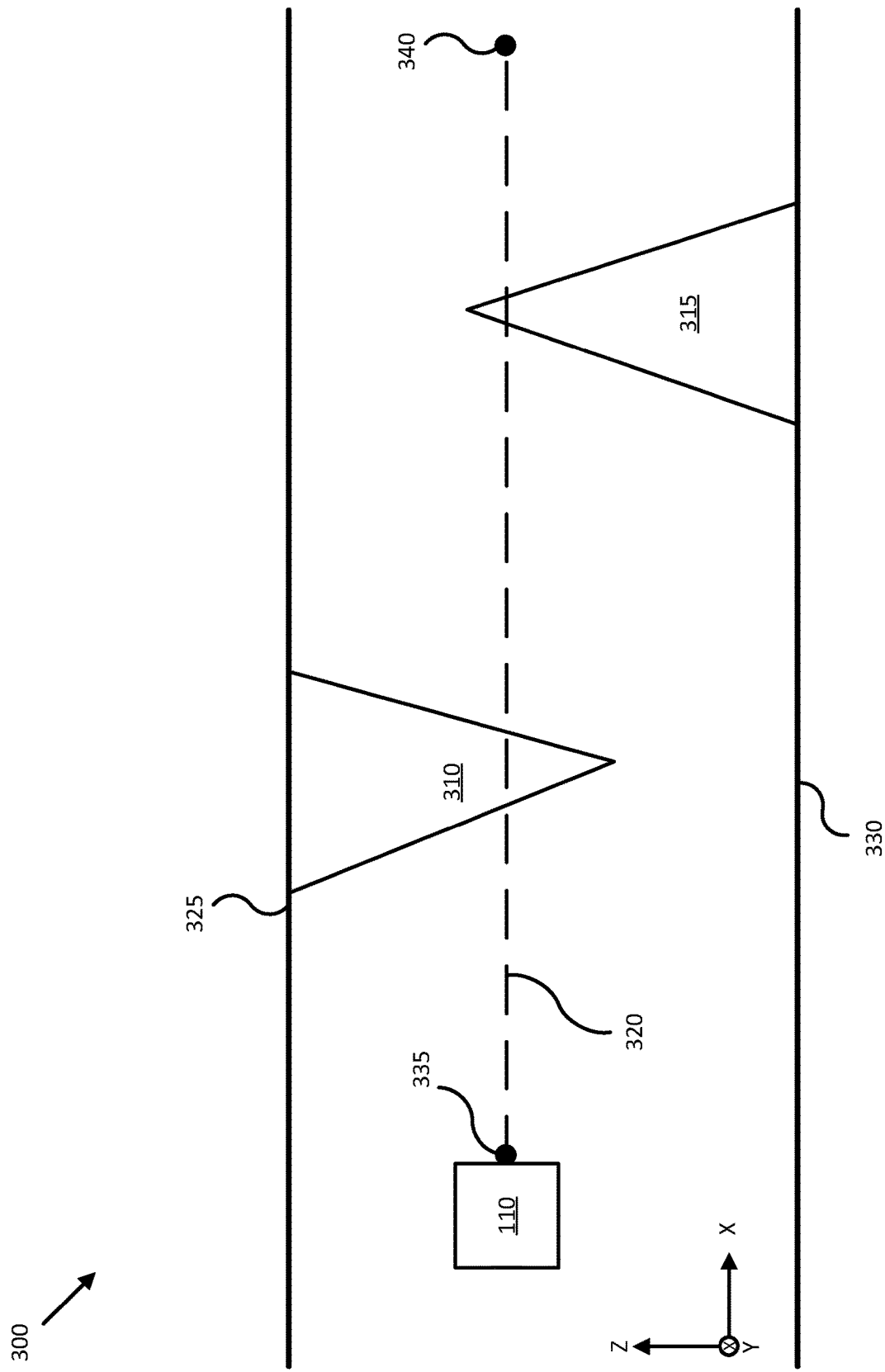
FIG. 3A illustrates a side view of a mobile platform of a survey system maneuvering in a survey area in accordance with an embodiment of the disclosure.
Figure 3B:
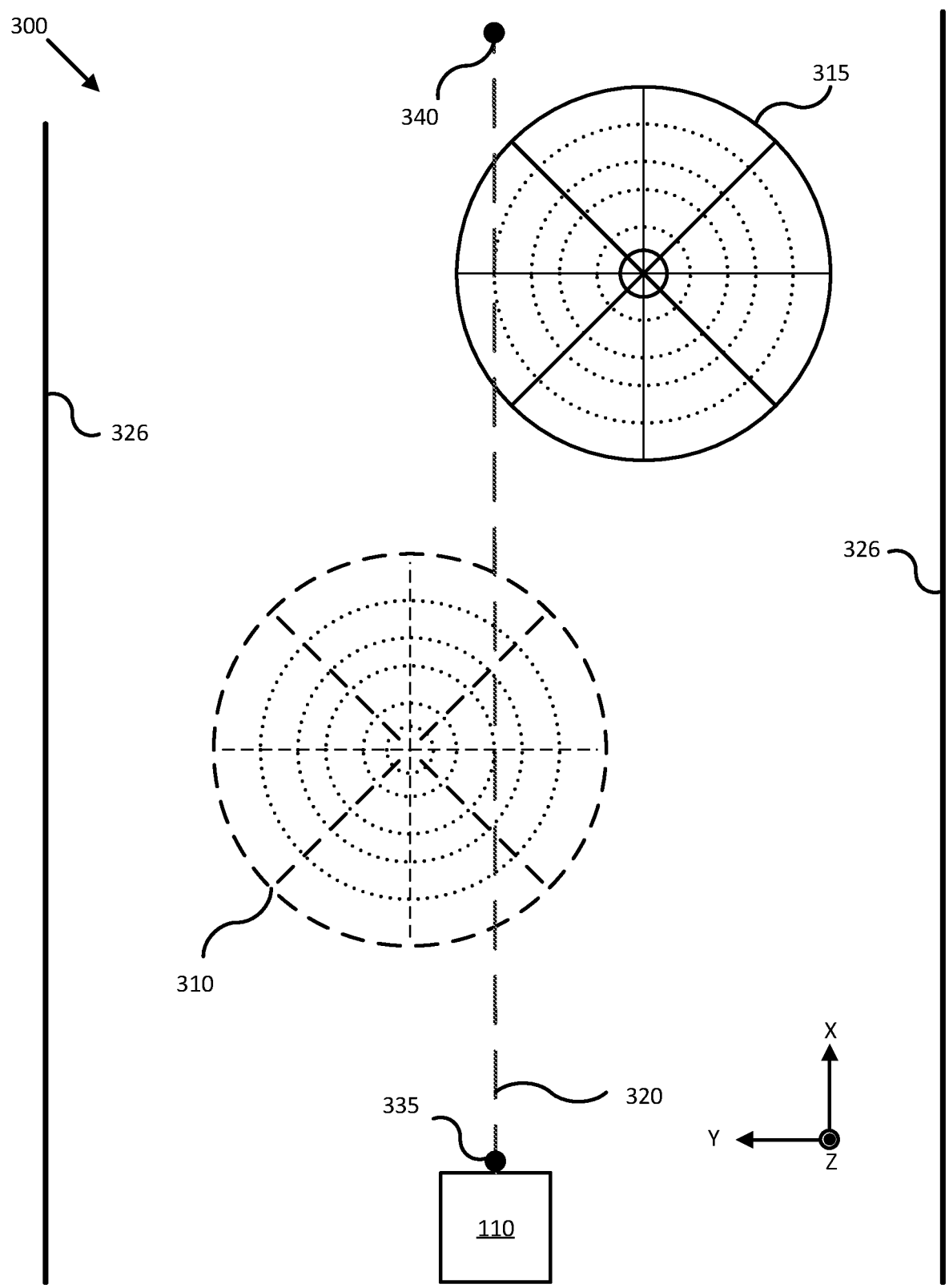
FIG. 3B illustrates a top view of a mobile platform of a survey system maneuvering in a survey area in accordance with an embodiment of the disclosure.

FIG. 3A illustrates a side view of mobile platform 110 of survey system 100 maneuvering in a survey area 300 in accordance with an embodiment of the disclosure. FIG. 3B illustrates a top view of mobile platform 110 of survey system 100 maneuvering in survey area 300. In various embodiments, mobile platform 110 may be implemented similarly to mobile platforms of survey systems 100 and/or 200 of FIGS. 1-2. As shown in FIGS. 3A-B, survey area 300 may correspond to a particular area to be traversed and/or surveyed by mobile platform 110, for example, and may include various obstacles (e.g., navigation impediments, obstructions, structures) that mobile platform 110 is configured to avoid as it maneuvers from a starting position (e.g., an anchor position 335) to a final destination (e.g., a projected destination 340) within survey area 300. In general, anchor position 335, projected destination 340, and/or a projected course 320 between them may be selected by a user and/or dictated by logistics of mobile platform 110, a survey pattern associated with survey area 300, and/or an overall mission objective, as described herein.

In the embodiments depicted in FIGS. 3A-B, survey area 300 may correspond to a cave with one or more stalactites 310, stalagmites 315, a cave floor 330, a cave ceiling 325, and/or cave walls 326. Each navigation impediment or limit represents a maneuvering obstruction that should be avoided by mobile platform 110 as mobile platform 110 traverses survey area 300 from anchor position 335 to projected destination 340 along projected course 320. Projected course 320 may be a simplified linear course of travel for mobile platform 110 between anchor position 335 and projected destination 340. Projected course 320 may be adjusted based on obstacles discovered by mobile platform 110 (e.g., using SER 145) as it traverses survey area 300, and adjustments or changes to projected course 320 may be referred to herein as avoidance courses. In various embodiments, projected destination 340 may be determined by mobile platform 110 based, at least in part, on a determined projected course 320, for example, and/or GPS coordinates generated by mobile platform 110 or received by mobile platform 110 (e.g., from base station 130) as part of a mission objective, as described herein.

Although FIGS. 3A-B show survey area 300 corresponding roughly to a cave, other survey areas and environments are contemplated in which mobile platform 110 traverses and avoids various other types of maneuvering obstructions. For example, mobile platform 110 may traverse survey areas with other natural maneuvering obstructions such as trees; survey areas with artificial maneuvering obstructions such as man-made structures, building interiors, survey areas inundated with thick smoke or other environmental conditions that impair visible spectrum vision, burning buildings, and various other survey areas with any number and kind of navigation obstacles.

In the embodiments shown in FIGS. 3A-B, mobile platform 110 is shown with a heading or direction of flight along projected course 320 that originates at anchor position 335 and ends at projected destination 340. A longitudinal axis of mobile platform 110 may be parallel to such heading and/or project from a front of mobile platform 110 and, in various embodiments, may be aligned with projected course 320 for mobile platform 110 as mobile platform 110 traverses projected course 320. In FIGS. 3A-B, projected course 320 and the longitudinal axis of mobile platform 110 are shown parallel to an X-axis of a coordinate system associated with mobile platform 110. Rotation of mobile platform 110 about such longitudinal axis may be referred to as a roll rotation. A vertical axis of mobile platform 110 may project from a top of mobile platform 110 and, in some embodiments, may be parallel (e.g., anti-parallel) with the direction of gravity relative to mobile platform 110. In some embodiments, such vertical axis may be selected to be perpendicular to a ground surface beneath mobile platform 110 (e.g., cave floor 330), for example, or may be selected to be rotated away from a top of mobile platform 110. In the embodiments shown in FIGS. 3A-B, the vertical axis is shown parallel to the Z-axis of the coordinate system associated with mobile platform 110, as depicted in FIG. 3A. A plane spanning the longitudinal axis and the vertical axis of mobile platform 110 may be referred to as the longitudinal plane, sagittal plane, or vertical plane. Rotation of mobile platform 110 about such longitudinal axis may be referred to as a yaw rotation. A lateral axis of mobile platform 110 may be perpendicular to both the longitudinal axis and the vertical axis of mobile platform 110. In this regard, the longitudinal, vertical, and lateral axis may be orthogonal to each other and form a local coordinate frame of mobile platform 110. A plane spanning the lateral axis and the longitudinal axis of mobile platform 110 may be referred to as the latitude plane, transverse plane, or horizontal plane. Rotation of mobile platform 110 about such lateral axis may be referred to as a pitch rotation.

In various embodiments, anchor position 335 acts as an origin for an established coordinate frame for mobile platform 110. While navigating from anchor position 335 to projected destination 340, mobile platform 110 may be configured to maneuver primarily in a series of straight line segments in order to safely avoid maneuvering obstructions identified by survey system 100. For example, if no maneuvering obstructions are detected, a single straight line segment projected course 320 may be projected between anchor position 335 (e.g., an origin of motion for mobile platform 110) and projected destination 340 (e.g., a final destination for mobile platform 110, such as a mission objective/observation position), and mobile platform 110 may traverse survey area 300 accordingly. In some embodiments, various other straight line segments may be formed between anchor position 335 and one or more avoidance destinations along one or more avoidance courses determined by mobile platform 110 as mobile platform 110 maneuvers to final projected destination 340. Mobile platform 110 may travel along such straight line segments to avoid colliding into maneuvering obstructions intersecting projected course 320, for example, by maneuvering laterally around or vertically under or above an obstacle. In this regard, mobile platform 110 may adjust projected course 320 to create an avoidance course to avoid colliding into such maneuvering obstructions.

In various embodiments, mobile platform 110 may be configured to determine an avoidance course for mobile platform 110 based, at least in part, on a three-dimensional occupancy map (e.g., generated using ranging sensor data provided by SER 145) and projected destination 340 associated with projected course 320. For example, mobile platform 110 (e.g., a logic device of mobile platform 110) may be configured to determine an avoidance course to maneuver mobile platform 110 from an avoidance anchor position on projected course 320 to an avoidance destination selected to avoid one or more maneuvering obstructions identified in such three-dimensional occupancy map, for example, and/or to minimize overall flight time, distance traveled, and/or to adhere to various other mission objectives. Mobile platform 110 may then maneuver from the avoidance anchor position to the avoidance destination along such avoidance course, as described herein.

In some embodiments, mobile platform 110 may perform a scan of survey area 300 relative to mobile platform 110 to provide ranging sensor data. Mobile platform 110 may, for example, use SER 145 coupled to gimbal system 122 to perform a scan of survey area 300 to provide one or more sets of ranging sensor data indicating a distance between SER 145 and a surface within survey area 300 intercepting a sensor axis of SER 145 corresponding to a single ranging sensor element of SER 145. Each set of ranging sensor data may correspond to different scans performed by SER 145 and/or mobile platform 110. For example, a first set of ranging sensor data may correspond to a horizontal planar scan of survey area 300 and a second set of ranging sensor data may correspond to a vertical planar scan of survey area 300. A controller of mobile platform 110 may communicate with gimbal system 122 to adjust an orientation of SER 145 relative to mobile platform 110 to facilitate scanning survey area 300 using SER 145. In various embodiments, a three-dimensional occupancy map sufficient to safely maneuver mobile platform 110 within scene 300 may be determined based, at least in part, on a horizontal planar occupancy map based on one or more such horizontal planar scans of survey area 300 and a vertical planar occupancy map based on one or more such vertical planar scans, as described herein.

Figure 3C:
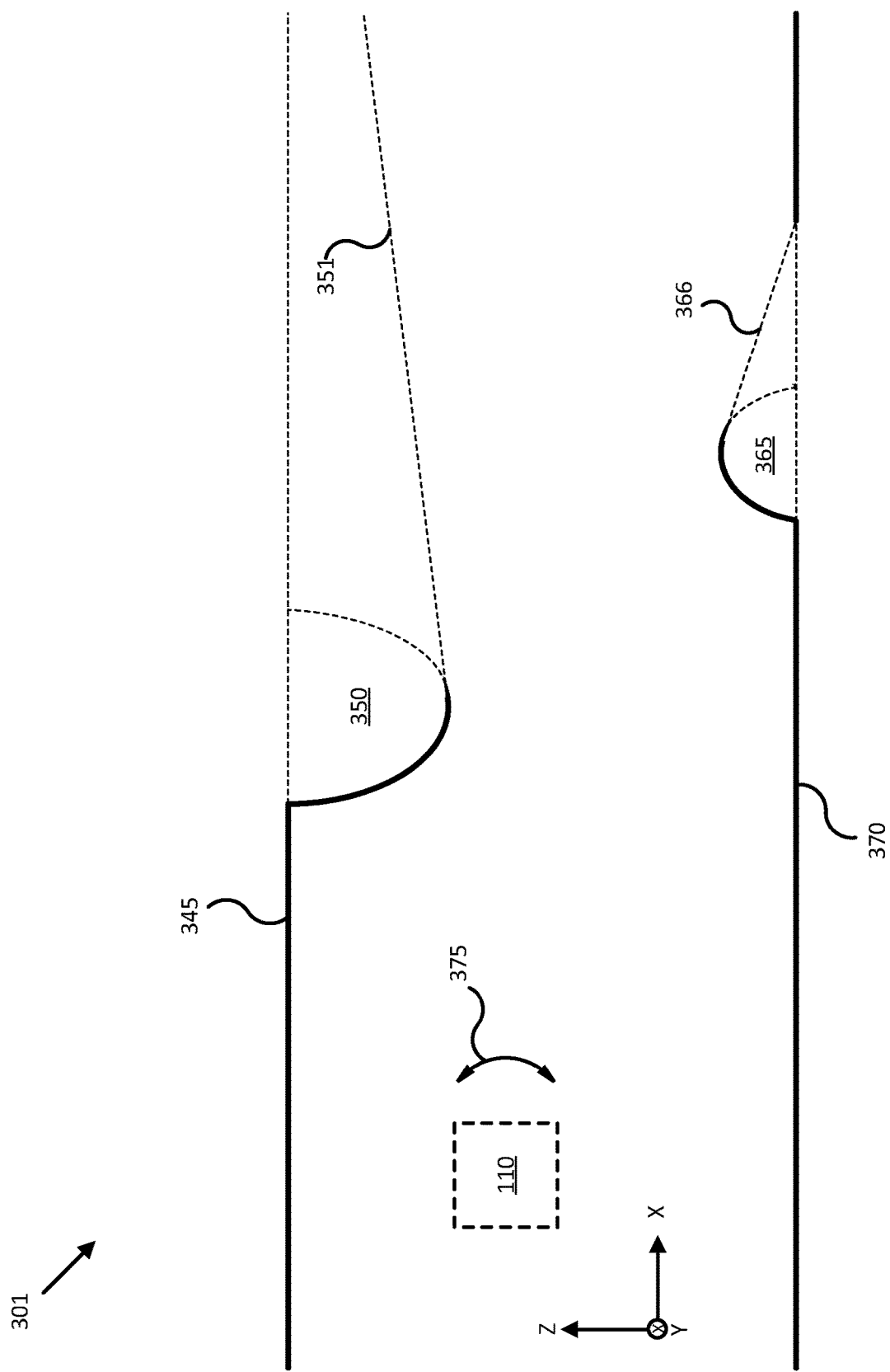
FIG. 3C illustrates a vertical planar occupancy map generated by a mobile platform of a survey system in accordance with an embodiment of the disclosure.

FIG. 3C illustrates a two-dimensional vertical planar occupancy map 301 generated by mobile platform 110 of survey system 100 in accordance with an embodiment of the disclosure. For example, mobile platform 110 may be configured to use SER 145 to perform a vertical scan of survey area 300 of FIGS. 3A-B (e.g., corresponding to a scan across at least a portion of the plane of the page for FIG. 3A) to measure distances between mobile platform 110 and maneuvering obstructions in the associated vertical plane and to generate vertical planar occupancy map 301. In some embodiments, generating vertical planar occupancy map 301 includes rotating SER 145 about a horizontal axis of mobile platform 110 and within a vertical plane defined, at least in part, by projected course 320 of mobile platform 110, to generate sets of ranging sensor data; determining a set of distances and corresponding relative orientations of SER 145 (e.g., associated with surfaces intersecting the vertical plane while SER 145 is rotated about a horizontal axis of mobile platform 110) based, at least in part, on the sets of ranging sensor data; and generating vertical planar occupancy map 301 based, at least in part, on the set of distances and corresponding relative orientations of SER 145, as described herein. For example, relative orientations of SER 145 may be determined through use of orientation sensor 114 (e.g., a compass/magnetometer), gyroscope/accelerometer 116 (e.g., by detecting gravity and/or integrating detected angular accelerations), and/or by receiving relative orientations from gimbal system 122.

Figure 3D:
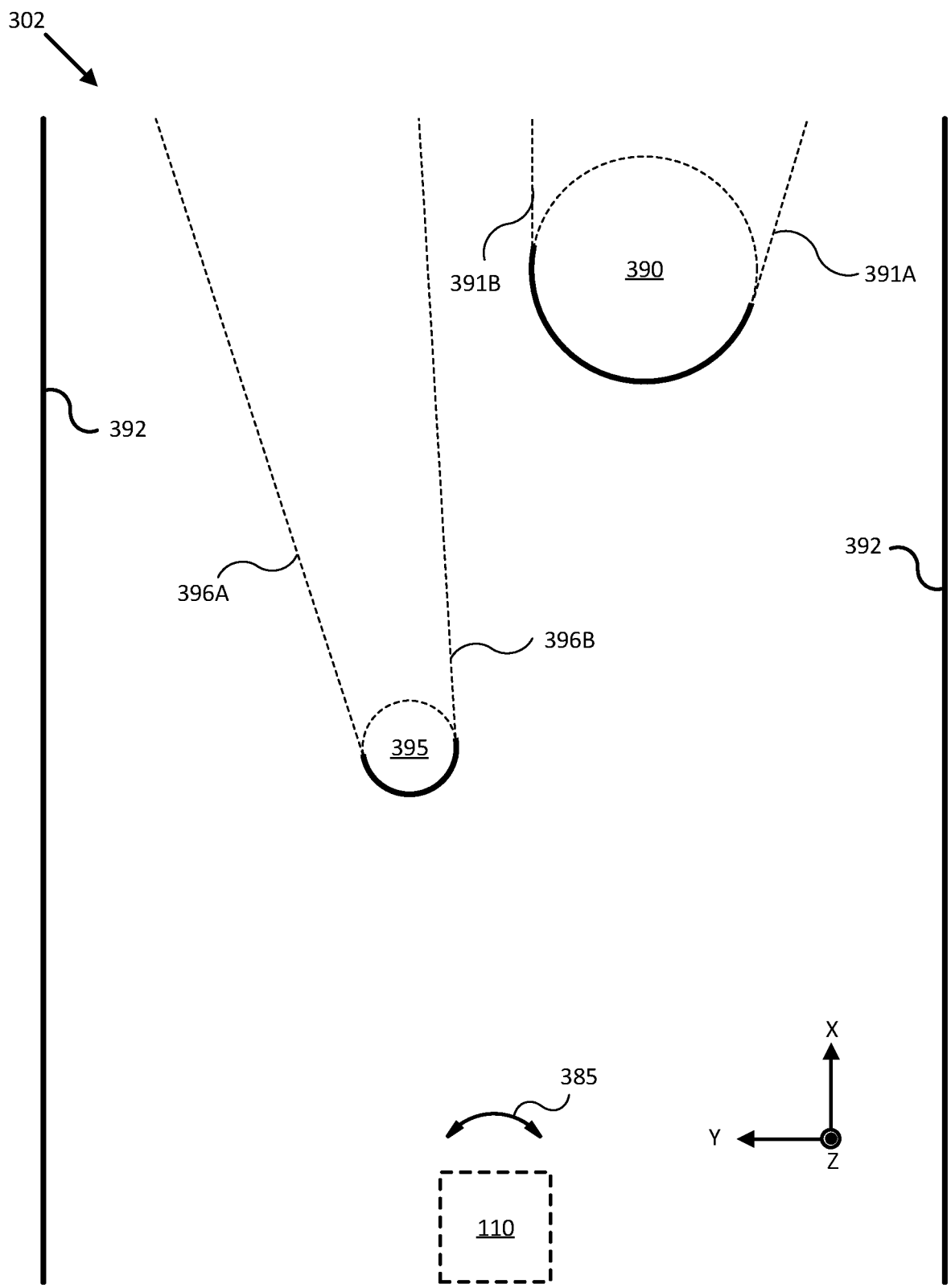
FIG. 3D illustrates a horizontal planar occupancy map generated by a mobile platform of a survey system in accordance with an embodiment of the disclosure.
Figure 3E:
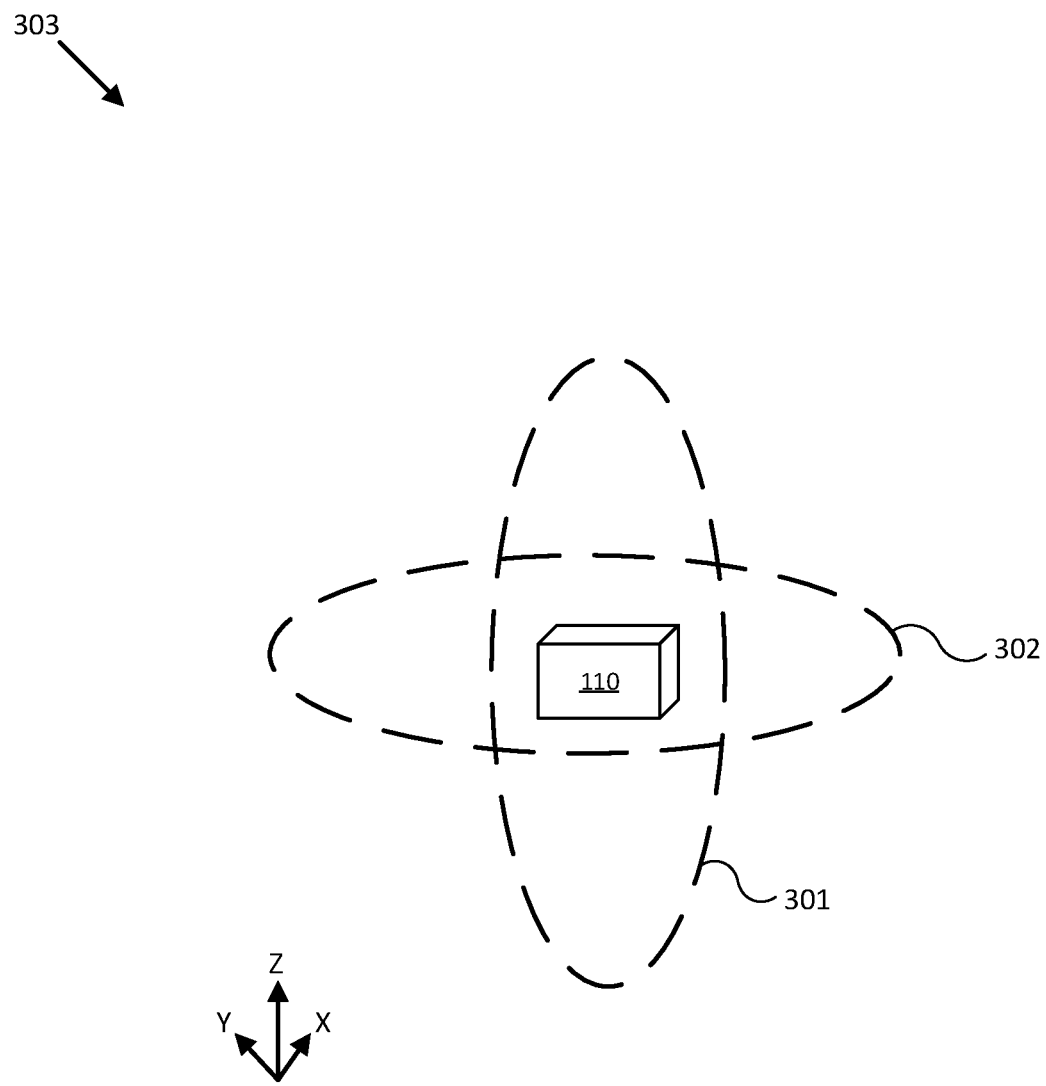
FIG. 3E illustrates a three-dimensional occupancy map generated by a mobile platform of a survey system in accordance with an embodiment of the disclosure.

In some embodiments, vertical planar occupancy map 301 may be used to prevent mobile platform 110 from drifting vertically while traversing projected course 320, thereby allowing horizontal planar occupancy map 302 of FIGS. 3D-E to remain valid to guide maneuvering of mobile platform 110 within survey area 300, as described herein. For example, a vertical scan of SER 145 may be used to update vertical planar occupancy map 301 and a position of mobile platform 110 within vertical planar occupancy map 301. Vertical planar occupancy map 301 and associated information may be monitored by controller 112 to prevent mobile platform 110 from drifting vertically along a vertical axis associated with mobile platform 110.

In various embodiments, vertical planar occupancy map 301 may be implemented as a two-dimensional geospatial map representative of a vertical plane spanning the vertical and longitudinal axes of mobile platform 110, for example, and may also be implemented as an occupancy grid associated with a vertical plane relative to mobile platform 110. In some embodiments, anchor position 335 (e.g., an initial or starting position for traversing survey area 300) may be used or established as an origin of vertical planar occupancy map 301. More generally, the origin of vertical planar occupancy map 301 may be established as a current position of mobile platform 110 within survey area 300/vertical planar occupancy map 301.

In some embodiments, mobile platform 110 may be configured to perform a vertical scan (e.g., also referred to herein as referred to herein as a longitudinal scan) by yawing or panning gimbal system 122 and/or mobile platform 110 to aim sensor payload 140 and/or a sensor axis of SER 145 parallel to projected course 320 and/or parallel to a vertical plane defined, at least in part, by projected course 320, and then pitching or tilting gimbal system 122 and/or mobile platform 110 to scan or orient sensor payload 140 and/or SER 145 across a vertical scan angle 375 (e.g., in a vertical plane defined in FIG. 3C as parallel to the X and Z axes) centered about a longitudinal axis of mobile platform 110, to measure distances to and/or associated with maneuvering obstructions in such vertical plane relative to mobile platform 110 as mobile platform 110 maneuvers along projected course 320 towards projected destination 340. For example, distances from SER 145/mobile platform 110 to portions of stalactite 310, stalagmite 315, cave ceiling 325, and cave floor 330 of survey area 300 may be measured during such vertical scan. Such vertical scan may be used to generate vertical planar occupancy map 301 and/or determine a position of mobile platform 110 within vertical planar occupancy map 301.

In some cases, vertical scan angle 375 may correspond to a full revolution of SER 145 (e.g., a 360 degree vertical scan). In other cases, vertical scan angle 375 may be less than a full revolution (e.g., +−90 degrees about projected course 320, +−45 degrees about projected course 320, or any range of solid angle between approximately 5 and 180 degrees about projected course 320). In some embodiments, a vertical scan angle 375 that is less than a full revolution may be used to increase operational efficiency by conserving power and time during vertical scans. In some embodiments, vertical planar occupancy map 301 may include an angular limited planar occupancy map generated based, at least in part, on angle-limited ranging sensor data. The angle-limited ranging sensor data may correspond to an arcuate portion of a vertical plane centered on projected course 320 an including an angular width between 5 degrees angular width and 180 degrees angular width.

As shown in vertical planar occupancy map 301 of FIG. 3C, the vertical scan may capture a stalactite portion 350, a stalagmite portion 365, a cave ceiling portion 345, and a cave floor portion 370 corresponding to survey area 300. Lines of sight (e.g., shadow boundaries) 351 and 366 represent the lines of sight of mobile platform 110 (e.g., the boundaries of vertical planar occupancy map 301 due to shadows cast by maneuvering obstructions) in survey area 300 as mobile platform 110 performs a vertical scan at anchor position 335. For example, stalactite 310 and stalagmite 315 of survey area 300 may partially obscure a scan view of mobile platform 110 in the vertical plane, decreasingly and/or differently as mobile platform 110 traverses survey area 300. Additional vertical scans performed while mobile platform 110 traverses survey area 300 may be used to fill such obscured portions of vertical planar occupancy map 301.

In various embodiments, mobile platform 110 may use vertical planar occupancy map 301 to determine a projected or avoidance course for mobile platform 110 as it maneuvers from anchor position 335 to projected destination 340. For example, if projected course 320 is obstructed by a maneuvering obstacle detected in vertical planar occupancy map 301, mobile platform 110 may perform further scans to update vertical planar occupancy map 301 and/or determine an appropriate avoidance course to reach projected destination 340 based, at least in part, on vertical planar occupancy map 301. In an embodiment, vertical planar occupancy map 301 may remain valid (e.g., for maneuvering mobile platform 110) while a lateral position of mobile platform 110 within survey area 300 substantially matches a lateral position of anchor position 335 (e.g., absolute or relative lateral positions). For example, vertical planar occupancy map 301 may be used to safely avoid maneuvering obstructions along projected course 320 while mobile platform 110 maintains projected course 320 without drifting laterally away from projected course 320.

In some embodiments, when a projected or avoidance course requires a new heading for mobile platform 110, mobile platform 110 may be configured to yaw to adjust its heading such that mobile platform 110 may maneuver along the new projected or avoidance course. When a new heading has been established to align with the new projected or avoidance course, mobile platform 110 may redefine the absolute orientations of its longitudinal and lateral axes so that they correspond to the new heading for mobile platform 110. Upon completing a heading adjustment, mobile platform 110 may generate a new and differently oriented vertical occupancy map, corresponding to the new heading/projected or avoidance course by performing an additional vertical scan using SER 145, as described herein. Establishing such new and differently oriented vertical occupancy map may be referred to herein as performing a vertical occupancy map switch.

In performing a vertical occupancy map switch, drift along any axis relative to mobile platform 110 should be avoided. For example, mobile structure 110 may be configured to use gimbal system 122 and/or SER 145 to help keep a vertical position of mobile platform 110 substantially constant during a yaw rotation to change a heading of mobile platform 110 and while performing a vertical occupancy map switch, which may allow a corresponding horizontal planar occupancy map (e.g., described with reference to FIG. 3D) to remain valid for maneuvering mobile platform 110 within survey area 300. In general, mobile platform 110 should not maneuver within survey area 300 without valid vertical and horizontal planar occupancy maps, as described herein, and upon detecting an occupancy map has become invalid (e.g., due to spatial drift beyond a maximum drift threshold), mobile platform 110 may be configured to halt traversal of survey scene 300 until valid occupancy maps can be generated using SER 145.

FIG. 3D illustrates a two-dimensional horizontal planar occupancy map 302 generated by mobile platform 110 of survey system 100 in accordance with an embodiment of the disclosure. For example, mobile platform 110 may be configured to use SER 145 to perform a horizontal scan of survey area 300 of FIGS. 3A-B (e.g., corresponding to a scan across at least a portion of the plane of the page for FIG. 3B) to measure distances between mobile platform 110 and obstructions in the associated horizontal plane and to generate horizontal planar occupancy map 302. In some embodiments, generating horizontal planar occupancy map 302 includes rotating SER 145 and/or mobile platform 110 about a vertical axis of mobile platform 110 and within a horizontal plane defined, at least in part, by projected course 320 of mobile platform 110, to generate sets of ranging sensor data; determining a set of distances and corresponding relative orientations or bearings of SER 145 and/or mobile platform 110 (e.g., associated with surfaces intersecting the horizontal plane while SER 145 is rotated about a vertical axis of mobile platform 110) based, at least in part, on the sets of ranging sensor data; and generating horizontal planar occupancy map 302 based, at least in part, on the set of distances and corresponding relative orientations or bearings of SER 145 and/or mobile platform 110, as described herein. For example, relative orientations or bearings of SER 145 and/or mobile structure 110 may be determined through use of orientation sensor 114 and/or gyroscope/accelerometer 116, by receiving relative orientations and/or bearings from gimbal system 122, and/or by controlling mobile platform 101 to rotate about its vertical axis according to a known yaw rate, for example, and indexing the set of distances by time in order to identify corresponding relative orientations and/or bearings.

In some embodiments, horizontal planar occupancy map 302 may be used to prevent mobile platform 110 from drifting laterally (e.g., or uncontrollably horizontally) while traversing projected course 320, thereby allowing vertical planar occupancy map 301 (e.g., of FIGS. 3C and E) to remain valid to guide maneuvering of mobile platform 110 within survey area 300, as described herein. For example, a horizontal scan of SER 145 may be used to update horizontal planar occupancy map 302 and a position of mobile platform 110 within horizontal planar occupancy map 302. Horizontal planar occupancy map 302 and associated information may be monitored by controller 112 to prevent mobile platform 110 from drifting horizontally along a lateral and/or longitudinal axis associated with mobile platform 110.

In various embodiments, horizontal planar occupancy map 302 may be implemented as a two-dimensional geospatial map representative of a horizontal plane spanning the longitudinal and lateral axes of mobile platform 110, for example, and may also be implemented as an occupancy grid associated with a horizontal plane relative to mobile platform 110. In some embodiments, anchor position 335 (e.g., an initial or starting position for traversing survey area 300) may be used or established as an origin of horizontal planar occupancy map 302. More generally, the origin of horizontal planar occupancy map 302 may be established as a current position of mobile platform 110 within survey area 300/horizontal planar occupancy map 302.

In some embodiments, mobile platform 110 may be configured to perform a horizontal scan (e.g., also referred to herein as referred to herein as a lateral scan) by yawing or panning gimbal system 122 and/or mobile platform 110 to aim sensor payload 140 and/or a sensor axis of SER 145 parallel to projected course 320 and/or parallel to a horizontal plane defined, at least in part, by an altitude and/or a projected course (e.g., projected course 320) of mobile platform 110, and then yawing or panning gimbal system 122 and/or mobile platform 110 to scan or orient sensor payload 140 and/or SER 145 across a horizontal scan angle 385 (e.g., in a horizontal plane defined in FIG. 3D as parallel to the X and Y axes) centered about a longitudinal axis of mobile platform 110, to measure distances to maneuvering obstructions in such horizontal plane relative to mobile platform 110 as mobile platform 110 maneuvers along projected course 320 toward projected destination 340. For example, distances from SER 145/mobile platform 110 to portions of stalactite 310, stalagmite 315, and cave walls 326 of survey area 300 may be measured during such horizontal scan. Such horizontal scan may be used to generate horizontal planar occupancy map 302 and/or determine a position of mobile platform 110 within horizontal planar occupancy map 302.

In some cases, horizontal scan angle 385 may correspond to a full revolution of SER 145 (e.g., a 360 degree horizontal scan). In other cases, horizontal scan angle 385 may be less than a full revolution (e.g., +−90 degrees about projected course 320, +−45 degrees about projected course 320, or any range of solid angle between approximately 5 and 180 degrees about projected course 320). In some embodiments, a horizontal scan angle 385 that is less than a full revolution may be used to increase operational efficiency by conserving power and time during horizontal scans. In some embodiments, horizontal planar occupancy map 302 may include an angular limited planar occupancy map generated based, at least in part, on angle-limited ranging sensor data. The angle-limited ranging sensor data may correspond to an arcuate portion of a horizontal plane centered on projected course 320 an including an angular width between 5 degrees angular width and 180 degrees angular width.

As shown in horizontal planar occupancy map 302 of FIG. 3D, a horizontal scan may capture a stalactite portion 395, a stalagmite portion 390, and cave wall portions 392 corresponding to survey area 300. Lines of sight (e.g., shadow boundaries) 396A-B and 391A-B represent the lines of sight of mobile platform 110 (e.g., the boundaries of horizontal planar occupancy map 302 due to shadows cast by maneuvering obstructions) in survey area 300 as mobile platform 110 performs a horizontal scan at anchor position 335. For example, stalactite 310 and stalagmite 315 of survey area 300 may partially obscure a scan view of mobile platform 110 in the horizontal plane, decreasingly and/or differently as mobile platform 110 traverses survey area 300. Additional horizontal scans performed while mobile platform 110 traverses survey area 300 may be used to fill such obscured portions of horizontal planar occupancy map 302.

In various embodiments, mobile platform 110 may use horizontal planar occupancy map 302 to determine a projected or avoidance course for mobile platform 110 as it maneuvers from anchor position 335 to projected destination 340. For example, if projected course 320 is obstructed by a maneuvering obstacle detected in horizontal planar occupancy map 302, mobile platform 110 may perform further scans to update horizontal planar occupancy map 302 and/or determine an appropriate avoidance course to reach projected destination 340 based, at least in part, on horizontal planar occupancy map 302. In an embodiment, horizontal planar occupancy map 302 may remain valid (e.g., for maneuvering mobile platform 110) while a vertical position of mobile platform 110 within survey area 300 substantially matches a vertical position of anchor position 335 (e.g., absolute or relative vertical positions). For example, horizontal planar occupancy map 302 may be used to safely avoid maneuvering obstructions along projected course 320 while mobile platform 110 maintains projected course 320 without drifting vertically away from projected course 320.

In some embodiments, when a projected or avoidance course requires adjusting an altitude for mobile platform 110, mobile platform 110 may be configured to use propulsion system 124 to adjust its altitude along the projected or avoidance course to reach a final or avoidance altitude/position. When a final or avoidance altitude has been reached, mobile platform 110 may redefine the altitude of its longitudinal and lateral axes so that it corresponds to the new altitude for mobile platform 110. Upon completing an altitude adjustment, mobile platform 110 may generate a new horizontal occupancy map, corresponding to the new altitude, by performing an additional horizontal scan using SER 145, as described herein. Establishing such new horizontal occupancy map may be referred to herein as performing a horizontal occupancy map switch.

In performing a horizontal occupancy map switch, drift along the longitudinal and lateral axes (e.g., horizontal drift) relative to mobile platform 110 should be avoided. For example, mobile structure 110 may be configured to use gimbal system 122 and/or SER 145 to help keep a horizontal position of mobile platform 110 within survey area 300 substantially constant while changing an altitude of mobile platform 110 and while performing a horizontal occupancy map switch, which may allow a corresponding vertical planar occupancy map (e.g., described with reference to FIG. 3C) to remain valid for maneuvering mobile platform 110 within survey area 300.

In various embodiments, a lack of information about the horizontal planar occupancy map at the new altitude may induce or at least allow for horizontal drift when performing a horizontal planar occupancy map switch, due to reliance on previous (e.g., before the altitude adjustment) horizontal planar occupancy maps. Such horizontal drift may be prevented, mitigated, and/or reduced by performing one or more frontal scans that at least partially span a horizontal and a vertical axis relative to mobile platform 110, while adjusting the altitude of mobile platform 110, for example, and determining and/or updating a corresponding frontal occupancy map based on the frontal scans. In various embodiments, each individual frontal scan may be a single scan of SER 145 between a heading of mobile platform 110 and a vertical axis of mobile platform 110. Mobile platform 110 may be configured to reference such frontal occupancy map while adjusting its altitude to help prevent horizontal drift. With an appropriate frontal occupancy maps, both longitudinal and lateral coordinates for mobile platform 110 within survey area 300 may be recovered at the new vertical coordinate (e.g., the new altitude). In general, such drift mitigation may be performed as part of a horizontal occupancy map switch, as described herein. A similar technique may be used to mitigate spatial drift during a vertical occupancy map switch, as described herein.

FIG. 3E illustrates a three-dimensional occupancy map 303 generated by mobile platform 110 of survey system 100 in accordance with an embodiment of the disclosure. In various embodiments, three-dimensional occupancy map 303 may include and/or be determined based on vertical planar occupancy map 301 and horizontal planar occupancy map 302, as described herein. For example, three-dimensional occupancy map 303 may include occupancy information (e.g., positions of surfaces of objects within survey area 300) derived from vertical planar occupancy map 301, horizontal planar occupancy map 302, and/or a frontal occupancy map generated by SER 145 of mobile platform 110. Three-dimensional occupancy map 303 may provide occupancy information associated with survey area 300 to estimate at least a partial extent of six degrees of freedom (e.g., 6 DoF) associated with motion of mobile platform 110. In general, occupancy information from vertical and horizontal planar occupancy maps 301 and 302 may be combined to determine three-dimensional occupancy map 303.

In various embodiments, mobile platform 110 may be configured to determine an avoidance course for mobile platform 110 based, at least in part, on three-dimensional occupancy map 303 and projected destination 340 associated with projected course 320. Such avoidance course may be determined to allow mobile platform 110 to maneuver from an avoidance anchor position on projected course 320 to an avoidance destination horizontally and/or vertically spaced from projected course 320 to avoid one or more maneuvering obstructions identified in three-dimensional occupancy map 303, such as stalactite portions 350 and 395 and/or stalagmite portions 365 and 390, as shown in FIGS. 3C-D. For example, mobile platform 110 may be configured to determine an avoidance course for mobile platform 110 by identifying one or more maneuvering obstructions along projected course 320 based, at least in part, on three-dimensional occupancy map 303, and determining an avoidance course for mobile platform 110 based, at least in part, on the identified one or more maneuvering obstructions.

In some embodiments, mobile platform 110 may be configured to identify one or more maneuvering obstructions along projected course 320 by identifying surfaces represented in three-dimensional occupancy map 303 that intersect and/or reside within a collision risk volume disposed about projected course 320 and/or mobile platform 110 based, at least in part, on projected course 320 (e.g., a direction and/or extent of projected course 320) and three-dimensional occupancy map 303 (e.g., portions or surfaces of maneuvering obstructions represented in three-dimensional occupancy map 303); and aggregating adjoining surfaces of the identified surfaces to form the one or more maneuvering obstructions along projected course 320. In various embodiments, a collision risk volume may be determined based on the dimensions and/or physical features of mobile platform 110. For example, mobile platform 110 will not be able to travel through a narrow portion of survey area 300 (e.g., narrower than an extent of mobile platform 110) if the narrow portion of survey area 300 includes surfaces that fall within a collision risk volume disposed about projected course 320. In one case, intersecting surfaces represented in three-dimensional occupancy map 303 may indicate a maneuvering obstruction along projected course 320, and adjoining surfaces of the identified surfaces may be aggregated to form one or more maneuvering obstructions (e.g., portions of stalactite 310 and/or stalagmite 315) along projected course 320.

In some embodiments, mobile platform 110 may be configured to determine velocity information associated with one or more objects identified within the three-dimensional occupancy map. Such velocity information may be derived from Doppler shifts provided in the ranging sensor data provided by SER 145 or by comparing the three-dimensional occupancy map to a prior-determined three-dimensional occupancy map of the same survey area 300. Objects with relative velocities approaching mobile platform 110 may be highlighted in a critical color (e.g., red or orange) within three-dimensional occupancy map 303 when rendered for a user (e.g., via user interface 132), for example, and may be used by mobile platform 110 to help determine an avoidance course to avoid both stationary and mobile maneuvering obstructions within survey area 300.

Figure 3F:
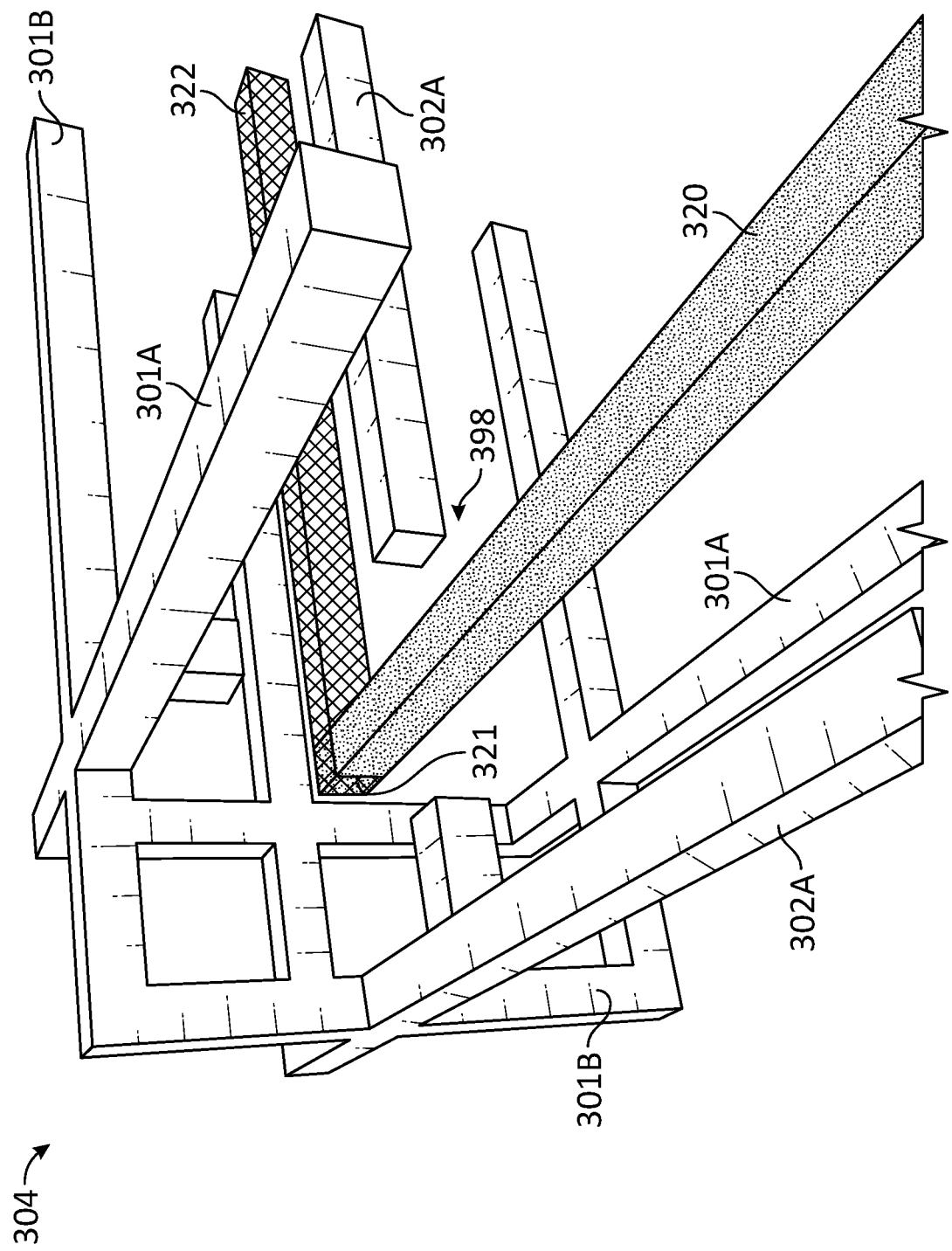
FIG. 3F illustrates a three-dimensional occupancy map generated by a mobile platform of a survey system in accordance with an embodiment of the disclosure.

FIG. 3F illustrates a three-dimensional occupancy map 304 generated by mobile platform 110 of survey system 100 in accordance with an embodiment of the disclosure. As shown in FIG. 3F, mobile platform 110 uses SER 145 to generate vertical planar occupancy map 301A and horizontal planar occupancy map 302A as mobile platform 110 travels along projected course 320 through hole 398 and approaches a maneuvering obstruction (e.g., a wall as shown in three-dimensional occupancy map 304) approximately at vertical occupancy map switch position 321, where mobile platform 110 changes its heading to travel along avoidance course 322 to avoid the detected wall. As mobile platform 110 travels along avoidance course 322, mobile platform 110 uses SER 145 to update/generate horizontal planar occupancy map 302A and to generate new vertical planar occupancy map 301B, as shown.

While vertical and horizontal planar occupancy maps 301 and 302 are generally described and presented as perpendicular to each other in FIGS. 3A-F, in other embodiments, they may not be perpendicular to each other (they may be non-orthogonal), for example, may generally not be parallel/perpendicular, respectively, to gravity, and/or may not be substantially aligned with a longitudinal, lateral, or vertical axis of mobile platform 110. For example, in some embodiments, horizontal planar occupancy map 301 may be oriented parallel to a local ground surface (e.g., cave floor 330 beneath mobile platform 110) within survey area 300, where the local ground surface includes a slope that is not perpendicular to gravity, and vertical planar occupancy map 302 may be oriented parallel to gravity or may be oriented perpendicular to horizontal planar occupancy map 301. In other embodiments, vertical planar occupancy map 302 may be oriented perpendicular to a local ground surface and horizontal planar occupancy map 301 may be oriented perpendicular to gravity. In further embodiments, an intersection line between a horizontal scan plane corresponding to horizontal planar occupancy map 301 and a vertical scan plane corresponding to vertical planar occupancy map 302 may be aligned to a direction of travel for mobile platform 110, such as projected course 320, which may not be perpendicular or parallel to gravity. In a specific embodiment, horizontal planar occupancy map 301 may be oriented parallel to a local ground surface and vertical planar occupancy map 302 may be aligned with trunks of trees within a survey area (e.g., generally aligned with gravity). In general, vertical planar occupancy map 301 and/or horizontal planar occupancy map 302 may be aligned with a coordinate frame of the mobile platform 110, a projected course through survey area 300, or local topography of survey area 300.

Figure 4A:
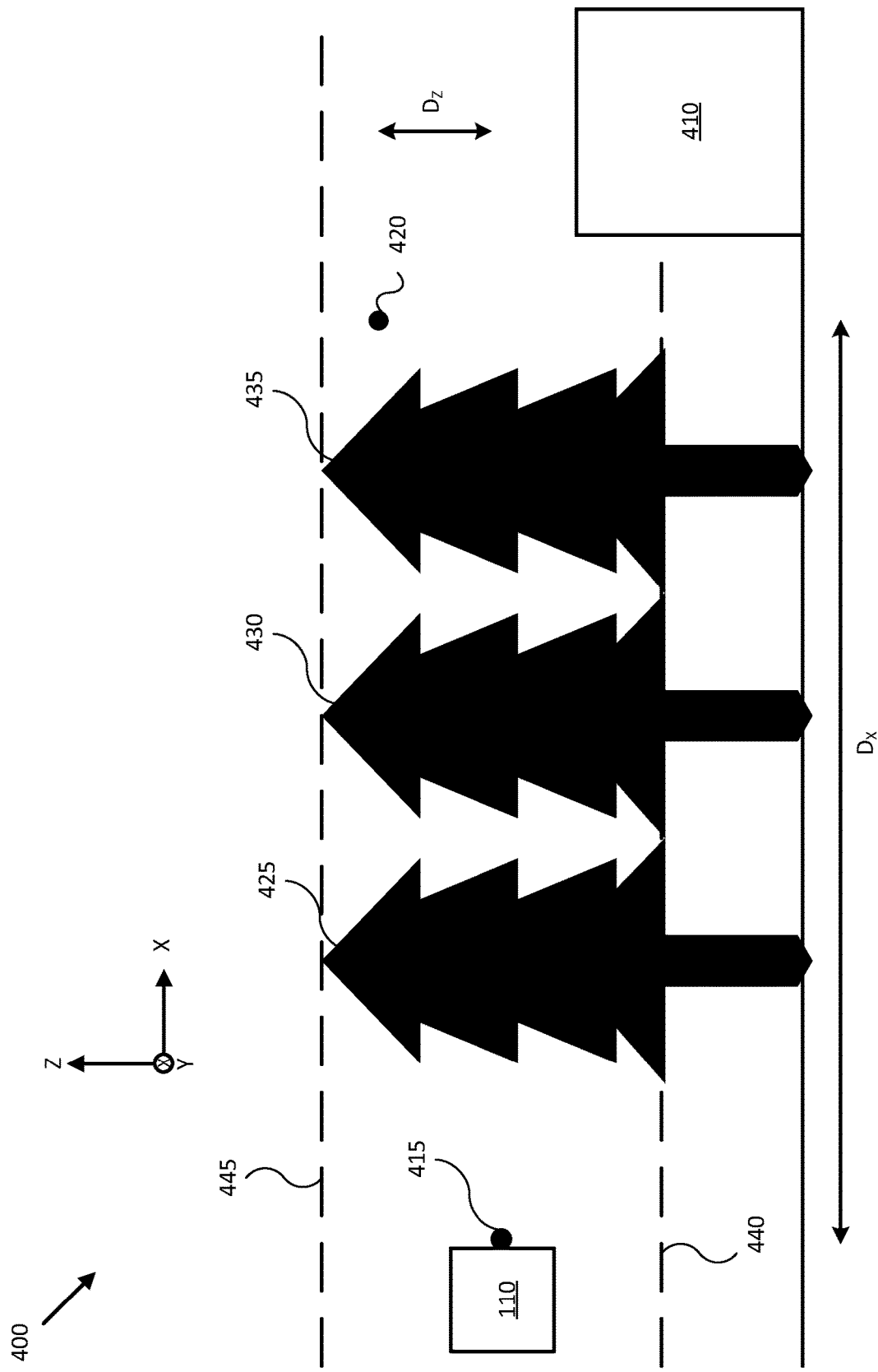
FIG. 4A illustrates a survey area associated with a mission objective for a mobile platform of a survey system in accordance with an embodiment of the disclosure.

FIG. 4A illustrates a survey area 400 associated with a mission objective for mobile platform 110 of survey system 100 in accordance with an embodiment of the disclosure. For example, such mission objective may include using localization and mapping to reach destination 420 (e.g., a projected destination) to monitor or image 410 at a preselected altitude (denoted as Dz in FIG. 4A). In some embodiments, such mission objective includes maneuvering mobile platform 110 from anchor position 415 to destination 420 according to various mission criteria associated with the mission objective. For example, such mission criteria may require mobile platform 110 travel a selected (e.g., maximum or minimum) translational distance, denoted as Dx in FIG. 4A, from anchor position 415 to destination 420, and/or may require mobile platform 110 adjust its altitude according to various limits as it navigates from anchor position 415 to destination 420.

In a particular embodiment, such mission objective may include mobile platform 110 completing a designated task at destination 420. For example, such designated task may include adjusting gimbal system 122 and/or orienting mobile platform 110 such that an imaging module (e.g., imaging module 142) of mobile platform 110 may be used to capture images and/or video of target 410, such as from a particular perspective or viewing position. In another embodiment, such task may include adjusting gimbal system 122 and/or orienting mobile platform 110 such that SER 145 may be used to measure a distance from destination 420 to target 410 (e.g., a surface of target 410), for example, or to measure or estimate an external size of target 410. In some embodiments, imaging module 142 may capture a first set of image data corresponding to a first set of ranging sensor data and capture a second set of image data corresponding to a second set of ranging sensor data. System 100 and/or 200 may generate a three-dimensional image map corresponding to a three-dimensional occupancy map (e.g., determined by use of SER 145, as described herein) based, at least in part, on the first and second sets of image data and the three-dimensional occupancy map. For example, such three-dimensional image map may include a spatial overlay of the image data onto the three-dimensional occupancy map. In some cases, an image sensor of imaging module 142 includes a visible spectrum image sensor, an infrared spectrum image sensor, a thermal image sensor, and/or a multispectrum image sensor. In various embodiments, the target 410 may be a structure, person, object, and/or any desired survey position designated by a mission objective associated with survey area 400.

In some embodiments, mission criteria of such mission objective may include directives to avoid maneuvering obstructions along a projected course from anchor position 415 to destination 420. For example, such mission criteria may include avoiding trees (e.g., trees 425, 430, and 435) as mobile platform 110 traverses survey area 400. In another example, such mission criteria may include avoiding various other maneuvering obstructions that may prevent mobile platform 110 from safely following a projected course within survey area 400. In a specific embodiment, such mission criteria may include staying within vertical boundaries 440 and 445 (e.g., roughly corresponding to a vertical foliage thickness associated with trees 425, 430, and 435) as mobile platform 110 traverses survey area 400 (e.g., so as to reduce risk of visual and/or audible identification of mobile platform 110 from above or below such foliage). As such, vertical boundaries 440 and 445 may be selected to provide a range of altitudes in which mobile platform 110 may maneuver without being detected by adversaries/third parties and/or target 410.

Figure 4B:
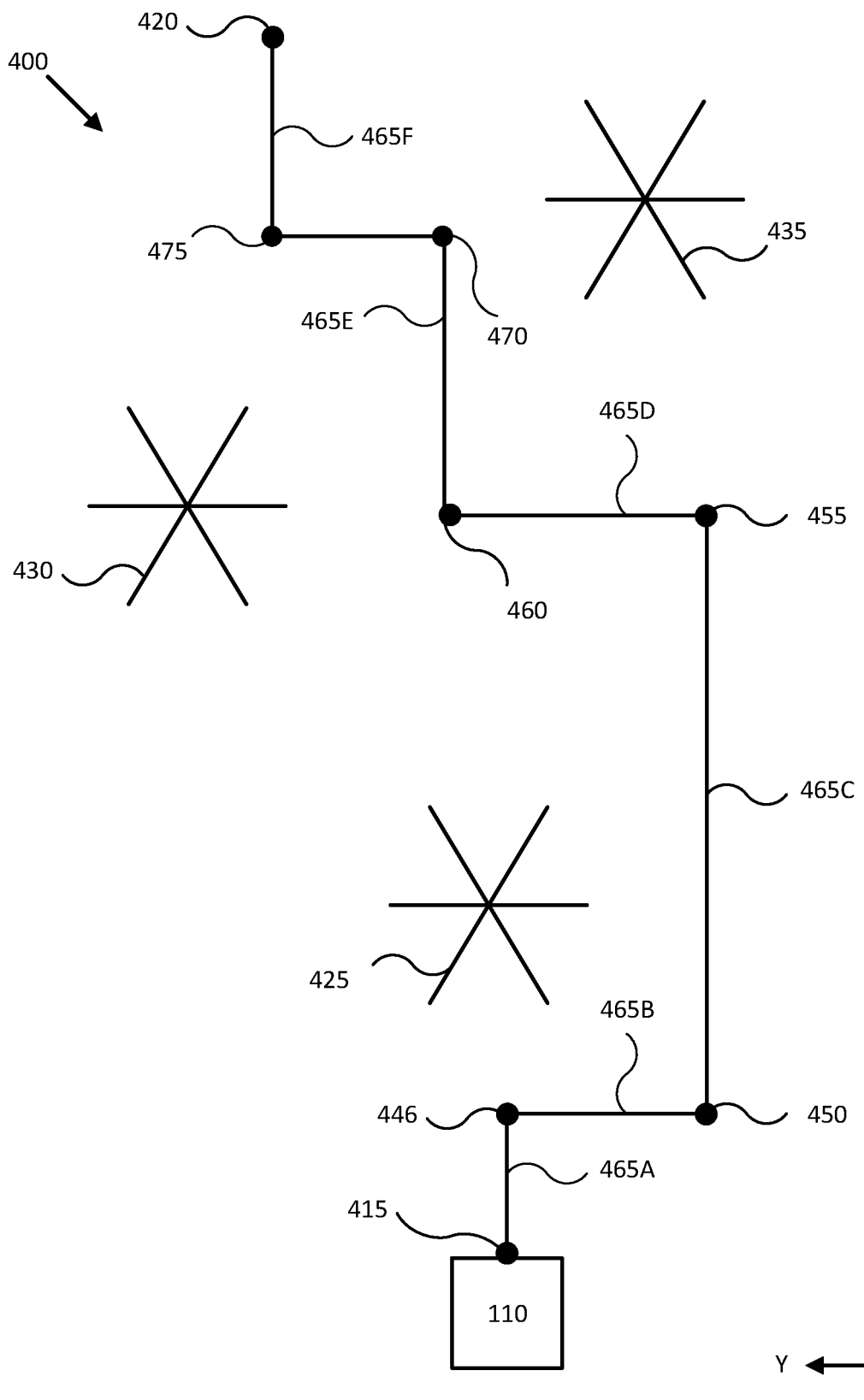
FIG. 4B illustrates a course for a mobile platform of a survey system based, at least in part, on a mission objective and a three-dimensional occupancy map associated with a survey area in accordance with an embodiment of the disclosure.

FIG. 4B illustrates a course for mobile platform 110 of survey system 100 based, at least in part, on a mission objective (e.g., observation of target 410) and a three-dimensional occupancy map (e.g., similar to three-dimensional occupancy map 303 of FIG. 3E and/or 304 of FIG. 3F) associated with survey area 400 in accordance with an embodiment of the disclosure. As shown in FIG. 4B, mobile platform 110 may be configured to maneuver through survey area 400 and avoid maneuvering obstructions (e.g., trees 425, 430, and 435) during performance of a particular mission objective. At anchor position 415, mobile platform 110 may perform a vertical scan and a horizontal scan to generate a three-dimensional occupancy map, as described herein. For example, mobile platform 110 may generate a vertical planar occupancy map and a horizontal planar occupancy map based on the vertical scan and the horizontal scan, respectively, and determine a three-dimensional occupancy map based on such vertical and horizontal planar occupancy maps. In some embodiments, mobile platform 110 may determine a projected course 465A based on anchor position 415, destination 420, and such three-dimensional occupancy map. Mobile platform 110 may then maneuver toward destination 420 along projected course 465A while performing vertical and/or horizontal scans to update a corresponding vertical occupancy map and/or horizontal planar map, and, thereby, update the corresponding three-dimensional occupancy map, as described herein.

In the embodiment shown in FIG. 4B, at anchor position 446, mobile platform 110 performs a full scan (e.g., a vertical scan and a horizontal scan, using SER 145) and generates and/or updates a three-dimensional occupancy map based on the resulting updated vertical and/or horizontal occupancy maps. Such three-dimensional occupancy map may indicate that tree 425 obstructs maneuvering of mobile platform 110 along projected course 465A from anchor position 415 to destination 420. As such, mobile platform 110 may be configured to determine that tree 425 obstructs projected course 465A, for example, and to determine, based on the generated three-dimensional occupancy map, an avoidance course 465B that avoids collision with tree 425. Mobile platform 110 may then adjust its heading and/or perform a vertical occupancy map switch, as described above, and travel towards anchor position/avoidance destination 450 along avoidance course 465B to proceed towards destination 420 and avoid tree 425. Intermediate positions associated with a course of mobile platform 110 within survey area 400, such as anchor position 450, selected to avoid maneuvering obstructions on a particular projected/avoidance course may be referred to as avoidance anchor positions or avoidance destinations (e.g., depending on whether mobile platform 110 is traveling toward or away from such position).

Upon reaching anchor position 450, mobile platform 110 may perform a full scan and determine that tree 425 is no longer obstructing traversal to destination 420. Mobile platform 110 may adjust its heading and continue toward destination 420 along projected course 465C, which may be selected to minimize excursions outside survey area 400 and/or based on other mission criterial associated with the overall mission objective. Upon reaching anchor position 455, mobile platform 110 may perform further scans using SER 145 and determine that tree 435 is obstructing maneuvering of mobile platform 110 along projected course 465C. Mobile platform 110 may then determine an avoidance course 465D to avoid collision with tree 435 and/or move closer to destination 420. Mobile platform 110 may then adjust its heading and travel towards anchor position/avoidance destination 460 along avoidance course 465D to proceed towards destination 420 and avoid tree 435. Upon reaching anchor position 460, mobile platform 110 may perform further scans and/or determine that tree 430 is obstructing avoidance course 465D. Mobile platform 110 may determine an avoidance course 465E to avoid collision with tree 430 and/or move closer to destination 420. Mobile platform 110 may then change its heading and travel towards anchor position/avoidance destination 470 along avoidance course 465E to proceed towards destination 420 and avoid trees 430 and/or 435. Upon reaching anchor position 470, mobile platform 110 may perform further scans using SER 145 and determine a projected course to reach destination 420 by traveling in a straight line course to anchor position 475. At anchor position 475, mobile platform 110 may determine that an altitude adjustment is necessary to reach destination 420. Mobile platform 110 may adjust its altitude and/or perform a horizontal map switch, as described above, then maneuver to destination 420 after determining that there are no remaining maneuvering obstacles along projected/closing course 465F.

In some embodiments, mobile platform 110 may be configured to determine closing course 465F for mobile platform 110 based, at least in part, on projected destination 420 associated with projected course 465F, where closing course 465F is configured to maneuver mobile platform 110 from avoidance destination 475 (e.g., one of the anchor positions of FIG. 4B that avoids an obstruction) to projected destination 420, and then to maneuver itself from avoidance destination 475 to projected destination 420 along projected course 465F. While mobile platform 110 maneuvers from avoidance destination 475 to projected destination 420, mobile platform 110 may continue to perform vertical and/or horizontal scans to determine and/or update a three-dimensional obstruction map and avoid maneuvering obstructions by determining corresponding avoidance courses, as described herein. More generally, as mobile platform 110 maneuvers within survey area 400 between trees 425, 430, and 435, and performs scans using SER145, mobile platform 110 may be configured to determine various projected and/or avoidance courses within the constraints of mission criteria associated with an overall mission objective, such as vertical boundaries 440 and 445 shown in FIG. 4A.

Figure 5:
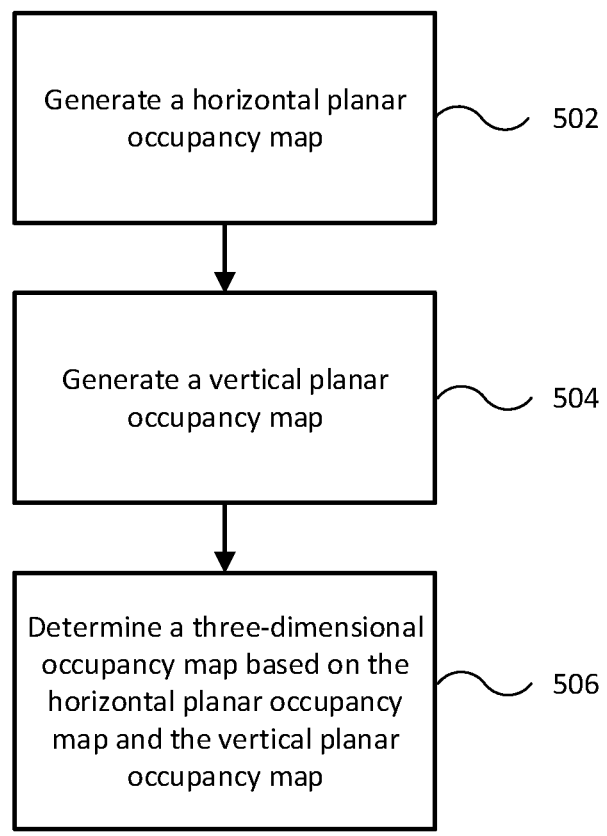
FIG. 5 illustrates a flow diagram of various operations to provide a three-dimensional occupancy map of a survey area in accordance with an embodiment of the disclosure.

FIG. 5 illustrates a flow diagram of various operations to provide a three-dimensional occupancy map of a survey area in accordance with an embodiment of the disclosure. As such, process 500 provides for mapping of a survey area and localization of mobile platform 110 within the survey area using SER 145 coupled to mobile platform 110. In some embodiments, the operations of FIG. 5 may be implemented as software instructions executed by one or more logic devices or controllers associated with corresponding electronic devices, sensors, and/or structures depicted in FIGS. 1-4B. For example, the mobile platform described with reference to process 500 of FIG. 5 may be implemented according to any one of mobile platforms 110, 110A, or 110B of FIGS. 1-4B. More generally, the operations of FIG. 5 may be implemented with any combination of software instructions, mechanical elements, and/or electronic hardware (e.g., inductors, capacitors, amplifiers, actuators, or other analog and/or digital components).

It should also be appreciated that any step, sub-step, sub-process, or block of process 500 may be performed in an order or arrangement different from the embodiments illustrated by FIG. 5. For example, in some embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 500 in FIG. 5 is described with reference to systems of FIGS. 1-4B, process 500 may be performed by other systems different from those systems and including a different selection of electronic devices, sensors, assemblies, mechanisms, platforms, and/or platform attributes.

At block 502, a horizontal planar occupancy map is generated for a horizontal plane. In some embodiments, the horizontal planar occupancy map is generated by rotating the mobile platform about a vertical axis of the mobile platform to generate a first set of ranging sensor data using a SER with a single ranging sensor element; determining a set of distances and corresponding relative bearings associated with surfaces intersecting the horizontal plane while the mobile platform is rotated about the vertical axis of the mobile platform, based, at least in part, on the first set of ranging sensor data; and generating the horizontal planar occupancy map based, at least in part, on the set of distances and relative bearings of the mobile platform.

In some embodiments, a controller for a mobile platform may communicate with a gimbal system coupled to the mobile platform. The gimbal system may adjust a sensor payload to align a SER, coupled to the sensor payload, with a horizontal plane relative to a coordinate system established by the mobile platform. In some embodiments, the mobile platform may then perform a horizontal scan by yawing through 360 degrees of rotation and measuring the distances between the mobile platform and obstacles in the horizontal plane. In various embodiment, the distances determined as a result of the horizontal scan are used to generate the horizontal planar occupancy map and the mobile platform's position within the horizontal planar occupancy map. In other embodiments, the distances determined as a result of the horizontal scan are used to update an existing horizontal occupancy map. This horizontal occupancy map may be monitored by the mobile platform to prevent drift in the lateral direction so that a vertical occupancy map remains valid.

At block 504, the vertical occupancy map is generated for a vertical plane. In some embodiments, generating the vertical planar occupancy map includes rotating a SER about a horizontal axis of a mobile platform and within a vertical plane defined, at least in part, by a projected course of the mobile platform, to generate a second set of ranging sensor data; determining a set of distances and corresponding relative orientations of SER 145 associated with surfaces intersecting the vertical plane while SER 145 is rotated about the horizontal axis of the mobile platform based, at least in part, on the second set of ranging sensor data; and generating the vertical planar occupancy map based, at least in part, on the set of distances and relative orientations of SER 145.

In some embodiments, a vertical scan may be performed by yawing the mobile platform to align SER 145 with the longitudinal axis of the established coordinate system for the mobile platform. The gimbal system may be controlled to cause angular rotation in the sensor payload such that SER 145, coupled to the sensor payload, may be used to measure distances to obstacles in the vertical plane. In some embodiments, the measurements captured by SER 145 may be used to update the vertical occupancy map and the mobile platform's position within the vertical occupancy map. In various embodiments, information associated with the vertical occupancy map may be used to prevent drift along the vertical axis of the established coordinate system for the mobile platform. In an aspect, preventing drift along the vertical axis ensures that the horizontal planar occupancy map remains valid.

At block 506, a three-dimensional occupancy map is determined based on the horizontal occupancy map and the vertical occupancy map. In an embodiment, information associated with the horizontal occupancy map and vertical planar map may be combined in a manner to provide the three-dimensional occupancy map. In an embodiment, the mobile platform may determine its own position relative to the three-dimensional occupancy map based on the three-dimensional occupancy map. For example, an origin position for the three-dimensional occupancy map may represent the mobile platform's position relative to the three-dimensional occupancy map. In an embodiment, the three-dimensional occupancy map may be represented as a three-dimensional occupancy grid.

Figure 6:
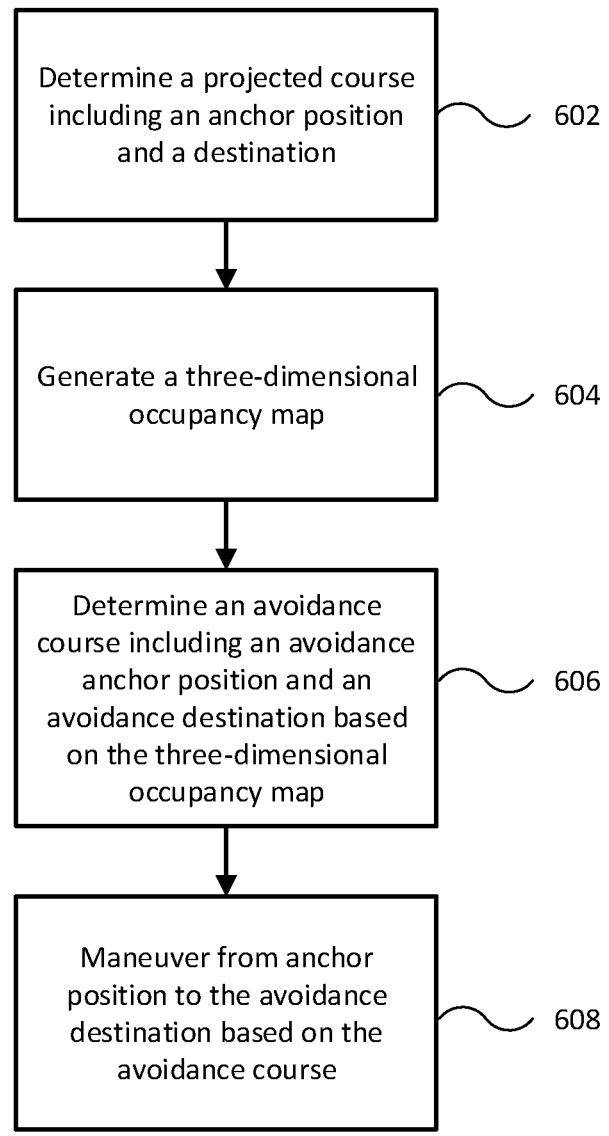
FIG. 6 illustrates a flow diagram of various operations to maneuver a mobile platform of a survey system within a survey area in accordance with an embodiment of the disclosure.

FIG. 6 illustrates a flow diagram of various operations to maneuver a mobile platform of a survey system within a survey area in accordance with an embodiment of the disclosure. As such, process 600 provides for mapping of a survey area and localization of mobile platform 110 within the survey area using SER 145 coupled to mobile platform 110. In some embodiments, the operations of FIG. 6 may be implemented as software instructions executed by one or more logic devices or controllers associated with corresponding electronic devices, sensors, and/or structures depicted in FIGS. 1-4B. More generally, the operations of FIG. 6 may be implemented with any combination of software instructions, mechanical elements, and/or electronic hardware (e.g., inductors, capacitors, amplifiers, actuators, or other analog and/or digital components).

It should also be appreciated that any step, sub-step, sub-process, or block of flow diagram 600 may be performed in an order or arrangement different from the embodiments illustrated by FIG. 6. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although the process described in flow diagram 600 is described with reference to devices, sensors, and/or structures depicted in FIGS. 1-4B, the process may be performed by other systems different from those devices, sensors, and/or structures and including a different selection of electronic devices, sensors, assemblies, mechanisms, platforms, and/or platform attributes.

At block 602, a projected course including an anchor position and a destination is determined. In an embodiment, a controller may determine that the mobile platform has arrived at an anchor position according to a previously generated three-dimensional occupancy map. For example, the anchor position may be determined to be an origin position of the three-dimensional occupancy map. In some embodiments, the controller may also communicate with a GNSS to determine that the mobile platform has arrived at an anchor position. In other embodiments, the controller may determine that the mobile platform has arrived at an anchor position by referencing a distance of the mobile platform to any obstacles determined to be from the three-dimensional occupancy map. In other embodiments, the controller may determine that an obstacle obstructs the mobile platform on a projected course and sets an anchor position at a location before the obstacle to prevent collision with the obstacle.

In an embodiment, the destination is determined by the mobile platform communicating with a base station. For example, the communications module of the base station may transmit a GPS coordinate to the communication module of the mobile platform, and the transmitted GPS coordinate that is received by the mobile platform may be the destination. In some embodiments, the destination may be determined based on a previous destination for the mobile platform. In this regard, the mobile platform (or base station) may store in memory any destinations from previous courses traveled by the mobile platform. The destinations may be retrieved from a memory source. In some embodiments, the controller may determine an avoidance destination based on a perspective destination being invalid. For example, if the perspective destination is a location in which a mobile platform may not physically maneuver, the controller will determine an avoidance destination to which the mobile platform may physically maneuver.

At block 604, a three-dimensional occupancy map is determined. In an embodiment, a horizontal planar occupancy map is generated for a horizontal plane. In some embodiments, a controller for a mobile platform may communicate with a gimbal system coupled to the mobile platform. The gimbal system may adjust a sensor payload to align a SER, coupled to the sensor payload, with a horizontal plane relative to a coordinate system established by the mobile platform. In some embodiments, the mobile platform may then perform a horizontal scan by yawing through 360 degrees of rotation and measuring the distances between the mobile platform and obstacles in the horizontal plane using SER 145. In various embodiment, the distances determined as a result of the horizontal scan are used to generate the horizontal planar occupancy map and the mobile platform's position within the horizontal planar occupancy map. In other embodiments, the distances determined as a result of the horizontal scan are used to update an existing horizontal occupancy map. This horizontal occupancy map may be monitored by the mobile platform to prevent drift in the lateral direction so that a vertical occupancy map remains valid.

In an embodiment, the vertical occupancy map is generated for a vertical plane. In an embodiment, a vertical scan may be performed by yawing the mobile platform to align SER 145 with the longitudinal axis of the established coordinate system for the mobile platform. The gimbal system may be controlled to cause angular rotation in the sensor payload such that SER 145, coupled to the sensor payload, may be used to measure distances to obstacles in the vertical plane. In some embodiments, the measurements captured by SER 145 may be used to update the vertical occupancy map and the mobile platform's position within the vertical occupancy map. In various embodiments, information associated with the vertical occupancy map may be used to prevent drift along the vertical axis of the established coordinate system for the mobile platform. In an aspect, preventing drift along the vertical axis ensures that the horizontal planar occupancy map remains valid.

In various embodiments, the three-dimensional occupancy map is determined based on the horizontal planar occupancy map and the vertical planar occupancy map. In an embodiment, information associated with the horizontal occupancy map and vertical planar map may be combined in a manner to provide the three-dimensional occupancy map. In an embodiment, the mobile platform may determine its own position relative to the three-dimensional occupancy map based on the three-dimensional occupancy map. For example, an origin position for the three-dimensional occupancy map may represent the mobile platform's position relative to the three-dimensional occupancy map. In an embodiment, the three-dimensional occupancy map may be represented as a three-dimensional occupancy grid.

At block 606, an avoidance course is determined. The avoidance course may include an avoidance anchor position and an avoidance destination based on the three-dimensional occupancy map. Determining the avoidance course for the mobile platform may be based, at least in part, on the three-dimensional occupancy map and/or a projected destination associated with the projected course. The avoidance course facilitates maneuvering the mobile platform from an avoidance anchor position on the projected course on the projected course to an avoidance destination to avoid one or more maneuvering obstructions identified in the three-dimensional occupancy map. In an aspect, the avoidance course may be determined by performing full scans and determining a direction in the vertical plane or horizontal plane that avoids the obstacle. The mobile platform may then maneuver in the direction to avoid the obstacle along the avoidance course. In an aspect, the mobile platform continuously or intermittently performs full scans along a projected course and/or avoidance course to determine if an avoidance course is required due to an obstruction.

At block 608, the mobile platform maneuvers from the avoidance anchor position to the avoidance destination according to the avoidance course. In an embodiment, the avoidance course may be determined to be the minimum amount of movement required to maneuver from the avoidance anchor position to the avoidance destination along straight line segments. For example, the avoidance course may be a minimum amount of movement required to maneuver to avoid an identified obstruction.

By providing such systems and techniques for three-dimensional mapping and localization, embodiments of the present disclosure substantially improve the operational flexibility and reliability of unmanned sensor platforms. For example, the present disclosure provides robust position and orientation techniques for situations where vision-based systems may fail on unmanned sensor platforms. The present techniques address the size, weight, and power consumption constraints of unmanned sensor platforms. Moreover, such systems and techniques may be used to increase the operational safety of unmanned mobile sensor platforms above that achievable by conventional systems. As such, embodiments provide mobile sensor platforms systems with significantly increased survey convenience and performance.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A system comprising:
a mobile platform;
a single element rangefinder (SER) comprising a single ranging sensor element, wherein the SER is configured to provide ranging sensor data indicating a distance between the SER and a surface intercepting a sensor axis of the SER corresponding to the single ranging sensor element;
a gimbal system configured to couple the SER to the mobile platform and adjust an orientation of and aim the SER relative to the mobile platform; and
a logic device configured to communicate with the SER, the gimbal system, and/or the mobile platform, wherein the logic device is configured to:
generate, at a first anchor position of the projected course, a horizontal planar occupancy map based, at least in part, on a first set of ranging sensor data, an altitude of the mobile platform, and a projected course of the mobile platform, wherein the first set of ranging sensor data corresponds to a horizontal planar scan of a survey area;
generate, at the first anchor position, a vertical planar occupancy map based, at least in part, on a second set of ranging sensor data and the projected course of the mobile platform, wherein the second set of ranging sensor data corresponds to a vertical planar scan of the survey area;
determine a three-dimensional occupancy map based, at least in part, on the horizontal planar occupancy map and the vertical planar occupancy map;
determine an avoidance course for the mobile platform based, at least in part, on the three-dimensional occupancy map and a projected destination associated with the projected course, wherein the avoidance course is configured to maneuver the mobile platform from an avoidance anchor position on the projected course to an avoidance destination to avoid one or more maneuvering obstructions identified in the three-dimensional occupancy map; and
maneuver the mobile platform from the avoidance anchor position to the avoidance destination, wherein maneuvering the mobile platform comprises at least adjusting a heading and/or altitude of the mobile platform.

2. The system of claim 1, wherein the sensor axis of the SER is aimed parallel to a horizontal plane defined, at least in part, by the altitude and the projected course of the mobile platform, and wherein the generating the horizontal planar occupancy map comprises:
rotating the mobile platform about a vertical axis of the mobile platform to generate the first set of ranging sensor data;
determining a set of distances and corresponding relative bearings associated with surfaces intersecting the horizontal plane while the mobile platform is rotated about the vertical axis of the mobile platform, based, at least in part, on the first set of ranging sensor data; and
generating the horizontal planar occupancy map based, at least in part, on the set of distances and relative bearings of the mobile platform.

3. The system of claim 1, wherein the generating the vertical planar occupancy map comprises:
rotating the SER about a horizontal axis of the mobile platform and within a vertical plane defined, at least in part, by the projected course of the mobile platform, to generate the second set of ranging sensor data;
determining a set of distances and corresponding relative orientations of the SER associated with surfaces intersecting the vertical plane while the SER is rotated about the horizontal axis of the mobile platform, based, at least in part, on the second set of ranging sensor data; and
generating the vertical planar occupancy map based, at least in part, on the set of distances and relative orientations of the SER.

4. The system of claim 1, wherein the avoidance anchor position comprises a first avoidance anchor position and the avoidance destination comprises a first avoidance destination; and
wherein the logic device is configured to:
linearly maneuver from the first avoidance anchor position to the first avoidance destination;

generate, at the first avoidance destination, an updated horizontal planar occupancy map and an updated vertical planar occupancy map;
determine an updated three-dimensional occupancy map based, at least in part, on the updated horizontal planar occupancy map and the updated vertical planar occupancy map;
determine an updated avoidance course for the mobile platform based, at least in part, on the updated three-dimensional occupancy map and the projected destination associated with the projected course,
redesignate the first avoidance destination as the second avoidance anchor position;
linearly maneuver from the second avoidance destination to the second avoidance destination; and
wherein the vertical planar occupancy map and the horizontal planar occupancy map are perpendicular relative to each other.

5. The system of claim 4, wherein the determining the avoidance course for the mobile platform comprises:
identifying the one or more maneuvering obstructions along the projected course based, at least in part, on the three-dimensional occupancy map; and
determining the avoidance course for the mobile platform based, at least in part, on the identified one or more maneuvering obstructions, wherein the identifying the one or more maneuvering obstructions along the projected course comprises:
identifying surfaces represented in the three-dimensional occupancy map that intersect and/or reside within a collision risk volume disposed about the projected course for the mobile platform based, at least in part, on the projected course and the three-dimensional occupancy map; and
aggregating adjoining surfaces of the identified surfaces to form the one or more maneuvering obstructions along the projected course.

6. The system of claim 4, wherein the logic device is configured to:
determine a closing course for the mobile platform based, at least in part, on the projected destination associated with the projected course, wherein the closing course is configured to maneuver the mobile platform from the avoidance destination to the projected destination; and
maneuver the mobile platform from the avoidance destination to the projected destination.

7. The system of claim 1, wherein the logic device is configured to:
communicate the three-dimensional occupancy map to a base station associated with the mobile platform for display by a user interface of the base station.

8. The system of claim 1, further comprising an imaging module coupled to the mobile platform and/or the gimbal system, wherein the imaging module comprises an image sensor configured to provide image data of a scene in view of the mobile platform and/or aligned with the sensor axis of the SER, and wherein the logic device is configured to:
capture a first set of image data corresponding to the first set of ranging sensor data;
capture a second set of image data corresponding to the second set of ranging sensor data; and
generate a three-dimensional image map corresponding to the three-dimensional occupancy map based, at least in part, on the first and second sets of image data and the three-dimensional occupancy map, wherein:
the mobile platform comprises an unmanned aerial vehicle;
the vertical planar occupancy map is oriented perpendicular to a local ground surface beneath the mobile platform; and
the image sensor comprises a visible spectrum image sensor, an infrared spectrum image sensor, a thermal image sensor, or a multi-spectrum image sensor.

9. The system of claim 1, wherein the logic device is configured to:
determine velocity information associated with one or more objects identified within the three-dimensional occupancy map, wherein the velocity information is derived from Doppler shifts provided in the ranging sensor data or is derived by comparing the three-dimensional occupancy map to a prior-determined three-dimensional occupancy map.

10. The system of claim 1, wherein:
the horizontal planer occupancy map or the vertical planar occupancy map comprises an angular limited planar occupancy map generated based, at least in part, on angle-limited ranging sensor data; and
the angle-limited ranging sensor data corresponds to an arcuate portion of a horizontal or vertical plane centered on the projected course and comprising an angular width between 5 and 180 degrees.

11. The system of claim 1, wherein the maneuvering further comprises performing a horizontal occupancy map switch to prevent lateral drift of the mobile platform when the mobile platform is adjusting the altitude associated with the avoidance course, wherein the performing the horizontal occupancy map switch comprises:
performing a frontal scan that at least partially spans the vertical axis relative to the mobile platform, and
determining a frontal occupancy map based on the frontal scan.

12. A method comprising:
generating, at a first anchor position of a projected course, a horizontal planar occupancy map based, at least in part, on a first set of ranging sensor data provided by a single element rangefinder (SER) coupled to a mobile platform via a gimbal system, an altitude of the mobile platform, and the projected course of the mobile platform, wherein the first set of ranging sensor data corresponds to a horizontal planar scan of a survey area, wherein the SER comprises a single ranging sensor element configured to provide ranging sensor data indicating a distance between the SER and a surface intercepting a sensor axis of the SER corresponding to the single ranging sensor element, and wherein the gimbal system is configured to adjust an orientation of and aim the SER relative to the mobile platform;
generating, at the first anchor position, a vertical planar occupancy map based, at least in part, on a second set of ranging sensor data provided by the SER and the projected course of the mobile platform, wherein the second set of ranging sensor data corresponds to a vertical planar scan of the survey area; and
determining a three-dimensional occupancy map based, at least in part, on the horizontal planar occupancy map and the vertical planar occupancy map;
determining an avoidance course for the mobile platform based, at least in part, on the three-dimensional occupancy map and a projected destination associated with the projected course, wherein the avoidance course is configured to maneuver the mobile platform from an avoidance anchor position on the projected course to an avoidance destination to avoid one or more maneuvering obstructions identified in the three-dimensional occupancy map; and maneuvering the mobile platform from the avoidance anchor position to the avoidance destination, wherein maneuvering the mobile platform comprises at least adjusting a heading and/or altitude of the mobile platform.

13. The method of claim 12, wherein the sensor axis of the SER is aimed parallel to a horizontal plane defined, at least in part, by the altitude and the projected course of the mobile platform, and wherein the generating the horizontal planar occupancy map comprises:

rotating the mobile platform about a vertical axis of the mobile platform to generate the first set of ranging sensor data;

determining a set of distances and corresponding relative bearings associated with surfaces intersecting the horizontal plane while the mobile platform is rotated about the vertical axis of the mobile platform; and generating the horizontal planar occupancy map based, at least in part, on the set of distances and relative bearings of the mobile platform.

14. The method of claim 13, wherein the determining the avoidance course for the mobile platform comprises:

identifying the one or more maneuvering obstructions along the projected course based, at least in part, on the three-dimensional occupancy map; and determining the avoidance course for the mobile platform based, at least in part, on the identified one or more maneuvering obstructions, wherein the identifying the one or more maneuvering obstructions along the projected course comprises:

identifying surfaces represented in the three-dimensional occupancy map that intersect and/or reside within a collision risk volume disposed about the projected course for the mobile platform based, at least in part, on the projected course and the three-dimensional occupancy map; and aggregating adjoining surfaces of the identified surfaces to form the one or more maneuvering obstructions along the projected course.

15. The method of claim 13, further comprising:

determining a closing course for the mobile platform based, at least in part, on the projected destination associated with the projected course, wherein the closing course is configured to maneuver the mobile platform from the avoidance destination to the projected destination; and maneuvering the mobile platform from the avoidance destination to the projected destination.

16. The method of claim 12, wherein the generating the vertical planar occupancy map comprises:

rotating the SER about a horizontal axis of the mobile platform and within a vertical plane defined, at least in part, by the projected course of the mobile platform, to generate the second set of ranging sensor data;

determining a set of distances and corresponding relative orientations of the SER associated with surfaces intersecting the vertical plane while the SER is rotated about the horizontal axis of the mobile platform; and generating the vertical planar occupancy map based, at least in part, on the set of distances and relative orientations of the SER.

17. The method of claim 12, wherein the avoidance anchor position comprises a first avoidance anchor position and the avoidance destination comprises a first avoidance destination; and the method further comprising:

linearly maneuvering from the first avoidance anchor position to the first avoidance destination;

generating, at the first avoidance destination, an updated horizontal planar occupancy map and an updated vertical planar occupancy map;

determining an updated three-dimensional occupancy map based, at least in part, on the updated horizontal planar occupancy map and the updated vertical planar occupancy map;

determining an updated avoidance course for the mobile platform based, at least in part, on the updated three-dimensional occupancy map and the projected destination associated with the projected course, redesignating the first avoidance destination as the second avoidance anchor position;

linearly maneuvering from the second avoidance destination to the second avoidance destination; and wherein the vertical planar occupancy map and the horizontal planar occupancy map are perpendicular relative to each other.

18. The method of claim 12, further comprising:

communicating the three-dimensional occupancy map to a base station associated with the mobile platform for display by a user interface of the base station.

19. The method of claim 12, further comprising:

capturing a first set of image data corresponding to the first set of ranging sensor data using an imaging module coupled to the mobile platform and/or the gimbal system, wherein the imaging module comprises an image sensor configured to provide image data of a scene in view of the mobile platform and/or aligned with the sensor axis of the SER;

capturing a second set of image data corresponding to the second set of ranging sensor data; and generating a three-dimensional image map corresponding to the three-dimensional occupancy map based, at least in part, on the first and second sets of image data and the three-dimensional occupancy map, wherein:

the mobile platform comprises an unmanned aerial vehicle; and the horizontal planar occupancy map is oriented perpendicular to a local ground surface beneath the mobile platform and is non-orthogonal to the vertical planar occupancy map; and the image sensor comprises a visible spectrum image sensor, an infrared spectrum image sensor, a thermal image sensor, or a multi-spectrum image sensor.

20. The method of claim 12, further comprising:

determining velocity information associated with one or more objects identified within the three-dimensional occupancy map, wherein the velocity information is derived from Doppler shifts provided in the ranging sensor data or is derived by comparing the three-dimensional occupancy map to a prior-determined three-dimensional occupancy map.

* * * * *